(12) United States Patent
D'Agostini et al.

(10) Patent No.: US 12,735,341 B2
(45) Date of Patent: Sep. 15, 2026

(54) METHOD AND SYSTEM FOR HEAT RECOVERY IN AN OXY-FUEL FIRED GLASS FURNACE

(71) Applicant: Air Products and Chemicals, Inc., Allentown, PA (US)

(72) Inventors: Mark Daniel D'Agostini, Allentown, PA (US); Kevin Michael Duffy, Alburtis, PA (US); Michael J. Gallagher, Coopersburg, PA (US); Ashwin Vinod, Macungie, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 45 days.

(21) Appl. No.: 18/754,401

(22) Filed: Jun. 26, 2024

(65) Prior Publication Data

US 2025/0011214 A1 Jan. 9, 2025

Related U.S. Application Data

(60) Provisional application No. 63/524,752, filed on Jul. 3, 2023.

(51) Int. Cl.
*C03B 5/237* (2006.01)
*C03B 5/20* (2006.01)
*C03B 5/235* (2006.01)
*C03B 5/24* (2006.01)

(52) U.S. Cl.
CPC .............. *C03B 5/237* (2013.01); *C03B 5/202* (2013.01); *C03B 5/2353* (2013.01); *C03B 5/24* (2013.01); *C03B 2211/60* (2013.01)

(58) Field of Classification Search
None
See application file for complete search history.

(56) References Cited

U.S. PATENT DOCUMENTS

| | | | |
|---|---|---|---|
| 5,807,418 | A | 9/1998 | Chamberland et al. |
| 6,113,874 | A | 9/2000 | Kobayashi |
| 9,541,290 | B2 | 1/2017 | Iyoha |
| 10,584,051 | B2 | 3/2020 | D'Agostini et al. |
| 10,788,208 | B2 | 9/2020 | Jarry et al. |

(Continued)

FOREIGN PATENT DOCUMENTS

| | | |
|---|---|---|
| EP | 3366994 | 8/2018 |

OTHER PUBLICATIONS

EP 3 336 430 machine translation, RAINER Mieth, Method for Recuperating Heat from a Flue Gas Generated by a Burner, Jun. 2018 (Year: 2018).*

*Primary Examiner* — Queenie S Dehghan
(74) *Attorney, Agent, or Firm* — Jason M. Ploeger

(57) ABSTRACT

Processes and systems for glass making can utilize heat recovery to improve operational efficiency and flexibility of operation to provide improved yield, higher quality, or more consistent quality glass, and/or other efficiencies. Some embodiments can utilize adjustments in burner operation to account for different manufacturing conditions to provide improved quality of fabricated glass to provide improved yields of glass with a more efficient utilization of heat, which can improve the environmental impact associated with the manufacturing process in addition to improving the operational efficiency and flexibility of the glass manufacturing process.

10 Claims, 12 Drawing Sheets

(56) References Cited

U.S. PATENT DOCUMENTS

| | | | | |
|---|---|---|---|---|
| 2013/0122442 | A1* | 5/2013 | D'Agostini | C03B 5/2353<br>432/13 |
| 2018/0237323 | A1* | 8/2018 | D'Agostini | F23D 14/56 |
| 2021/0122659 | A1* | 4/2021 | D'Agostini | F23L 7/007 |

* cited by examiner 100
96
76
6
78
R2
R1
R2

METHOD AND SYSTEM FOR HEAT RECOVERY IN AN OXY-FUEL FIRED GLASS FURNACE

CROSS-REFERENCE TO RELATED APPLICATIONS

The present application claims priority to U.S. Provisional Patent Application No. 63/524,752, which was filed on Jul. 3, 2023.

TECHNICAL FIELD

This disclosure relates generally to processes and systems for producing glass. More specifically, this disclosure is related to processes and related systems for producing glass with the use of heat recovery.

BACKGROUND OF THE INVENTION

Glassmaking is an energy intensive process. The process requires the use of a glass furnace to heat a glassmaking material (e.g., sand, soda ash, limestone, dolomite, feldspar, rouge, cullet, or combinations thereof) at a high enough temperature to melt the glassmaking material thereby forming the glass. In order to achieve these temperatures, the combustion of a hydrocarbon fuel (e.g., natural gas) in the glass furnace is often used necessary. The combustion process, however, produces a gaseous combustion product (known as flue gas) that exits the furnace at temperatures well over 1000° C. The temperature at which the flue gas exits the furnace is a considerable waste of energy unless the flue gas' heat energy is partially recovered from the flue gas.

SUMMARY OF THE INVENTION

We have determined that glass making can be configured to provide a more efficient and flexible utilization of heat to provide enhanced operational efficiency as well as a reduced environmental impact associated with making glass. For example, flue gas from combustion of fuel via one or more burners of a furnace used to melt and form glass from glass raw materials can be operated more flexibly to facilitate improved startup operation as well as improved flame and heat generation that can result in lower nitrous oxide formation and/or improved use of heat from the heat generated via combustion of a fuel. Embodiments can also be configured for providing enhanced flexibility for use of pre-heated oxidant, fuel, and raw material fees to provide a more efficient use of heat as well as providing enhanced flexibility in operation to permit operations to be adapted to different conditions so a more consistent and higher quality glass can be made.

Some embodiments can be configured and implemented so that glassmaking can be provided such that heat energy of the flue gas exiting an oxy-fuel furnace during glassmaking is not only captured, but the overall energy consumption and, optionally, the amount of nitrous oxide (NOx) produced during glassmaking can be lowered while simultaneously improving the overall quality of the glass produced that is produced. Embodiments can also be provided so that the utilization of the flue gas heat that is captured can be adjustable to account for glass making parameters that can affect quality of the glass being made as well as other processing parameters (e.g. temperature of the furnace, etc.).

In a first aspect, a method for producing glass can be provided. The method can include feeding fuel and oxidant to burners of a furnace to combust the fuel to heat glass making material for making glass such that: (i) at least one burner in at least one upstream zone of the furnace operates in a mode of operation in which an inner flow of fuel and an inner flow of oxidant are output into the furnace between an upper oxidant conduit and a lower oxidant conduit such that a flame is formed to project into a combustion chamber of the furnace without upper oxidant staging via the upper oxidant conduit and without lower oxidant staging via the lower oxidant conduit while the oxidant is below a pre-selected hot oxidant temperature threshold, and (ii) at least one burner in at least one downstream zone of the furnace that is downstream of the at least one upstream zone of the furnace is operated in a foam control mode of operation in which an upper oxidant flow is passed out of an upper oxidant conduit of the burner along with an inner flow of fuel and an inner flow of oxidant that are output into the furnace so that combustion of the fuel from the at least one burner in the at least one downstream zone of the furnace forms a flame that extends upwardly to provide a reducing atmosphere adjacent the glass making material in the at least one downstream zone of furnace to dissolve foam back into the glass making material while the oxidant is below the pre-selected hot oxidant temperature threshold.

In some embodiments, all the burners in the at least one upstream zone can operate without upper oxidant staging and lower oxidant staging while the oxidant is below a pre-selected hot oxidant temperature threshold. Also, all the burners in the at least one downstream zone can operate in the foam control mode. In some embodiments, the upstream zone can be a first zone and the downstream zone can be a second zone. In other embodiments, the at least one upstream zone can include a first zone, a second zone, and a third zone and the downstream zone can include a fourth zone and a fifth zone. The second zone can be between the first zone and the third zone and the fourth zone can be between the third zone and the fifth zone.

Embodiments of the method can include other steps or features. Also, embodiments of a system can be configured to implement an embodiment of the method.

In a second aspect, the method for producing glass can also include passing flue gas output from the furnace through an oxidant preheater positioned downstream of the furnace between a stack and the furnace for preheating at least a portion of the oxidant before the oxidant is fed to the burners of the furnace. Some embodiments can also include passing the flue gas through a fuel preheater positioned downstream of the furnace between the stack and the furnace for preheating at least a portion of the fuel before the fuel is fed to the burners. The fuel preheater can be positioned upstream of the oxidant preheater or downstream of the oxidant preheater. Conduit arrangements can be provided so that the fuel can at least partially bypass the fuel preheater, the oxidant can at least partially bypass the oxidant preheater and/or the flue gas can at least partially bypass the oxidant preheater and/or the fuel preheater. Embodiments of the method can also include adjustment in operation so that the portions of fuel, oxidant, and/or flue gas that bypass different preheaters can be adjusted to account for a desired operational condition of the furnace system and/or the burners.

For instance, in some embodiments the method of producing glass can include preheating at least a portion of the oxidant via an oxidant preheater positioned to heat the oxidant before the oxidant is fed to the burners of the furnace via flue gas output from the furnace that is passed through the oxidant preheater and/or preheating at least a portion of the fuel via a fuel preheater positioned to heat the fuel before the fuel is fed to the burners of the furnace via flue gas output from the furnace that is passed through the fuel preheater.

In a third aspect, embodiments of the method for producing glass can include adjusting operation of the at least one burner in the at least one upstream zone of the furnace so that the at least one burner of the at least one upstream zone of the furnace is adjusted to a split staging mode of operation in which oxidant is passed out of the lower oxidant conduit and is also passed out of the upper oxidant conduit in addition to the oxidant being passed out of the inner oxidant conduit and fuel being passed out of the inner fuel conduit in response to detecting the oxidant is at or above the pre-selected hot oxidant temperature threshold.

In a fourth aspect, embodiments of the method for producing glass can include adjusting operation of the at least one burner in the at least one upstream zone of the furnace so that the at least one burner of the at least one upstream zone of the furnace is adjusted to a mode of operation in which the flame has a radiative underside that is promoted via an oxidant flow passed out of the lower oxidant conduit without oxidant staging being provided via the upper oxidant conduit of the at least one burner of the at least one upstream zone in response to detecting the oxidant is at a pre-selected hot oxidant temperature threshold. In some embodiments, the flame can have a radiative underside such that radiative heat is directed along an unobstructed radiative path directly to an upper surface of the glass making material in the at least one upstream zone of the furnace.

In a fifth aspect, the method of producing glass can include passing the flue gas output from the furnace to a fluid heater to heat a heating medium that is feedable to a glass making feed material pre-heating device. The fluid heater can be positioned between the stack and the furnace. In some embodiments, the fluid heater can be positioned upstream of the oxidant preheater and also upstream of the fuel preheater.

Embodiments of the method can also include feeding a portion of the glass making material to the glass making feed material pre-heating device for preheating the portion of the glass making material and outputting the preheated portion of the glass making material from the glass making feed material pre-heating device to feed to the furnace. The preheating of the glass making material fed to the glass making feed material pre-heating device can be facilitated via the heated heating medium output from the fluid heater.

In some embodiments, the glass making feed material pre-heating device can include a rotatable shaft having flights that are rotatable to pass the portion of the glass making material fed to the glass making feed material pre-heating device through the glass making feed material pre-heating device. The rotatable shaft can be hollow in some embodiments and the method can also include passing heated air through a hollow shaft of the glass making feed material pre-heating device for passing into the portion of the glass making material as it passes through the glass making feed material pre-heating device. The heated air can be used to help facilitate the flow of the glass making feed material through the glass making feed material pre-heating device. In some embodiments, the method can also include forming a slip stream of the heating medium output from the fluid heater to pass through a heat exchanger for heating the air to output the heated air for feeding to the hollow shaft of the glass making feed material pre-heating device.

In a sixth aspect, the method for producing glass can also include adjusting operation of the at least one burner in the at least one downstream zone of the furnace so that the at least one burner of the at least one downstream zone of the furnace is adjusted to a split staging mode of operation in which oxidant is passed out of the lower oxidant conduit and is also passed out of the upper oxidant conduit in addition to the oxidant being passed out of the inner oxidant conduit and fuel being passed out of the inner fuel conduit in response to detecting the oxidant is at or above the pre-selected hot oxidant temperature threshold. This type of adjustment can occur for all the burners of the at least one downstream zone in some embodiments. This type of adjustment can occur in combination with an adjustment in operation of one or more (or all) of the burners of the at least one upstream zone.

In a seventh aspect, the method for producing glass can also include adjusting a flow of the oxidant so at least some of the oxidant bypasses an oxidant preheater positioned between the furnace and the stack after the oxidant is at or above the pre-selected hot oxidant temperature threshold and/or adjusting a flow of the fuel so at least some of the fuel bypasses a fuel preheater positioned between the furnace and the stack after the oxidant is at or above the pre-selected hot oxidant temperature threshold and/or adjusting a flow of the flue gas so that at least a portion of the flue gas bypassed the oxidant preheater and/or the fuel preheater after the oxidant is at or above the pre-selected hot oxidant temperature threshold.

In an eight aspect, an embodiment of the method of the first aspect can include one or more features of the second aspect, third aspect, fourth aspect, fifth aspect, sixth aspect, and/or seventh aspect. Embodiments may also utilize other process steps or elements. Some embodiments can also utilize an embodiment of a system for making glass or an arrangement of burners in a furnace of such a system. Examples of additional embodiments of the method can be appreciated from exemplary embodiments discussed herein, for instance.

In a ninth aspect, a system for making glass can be provided. Some embodiments of the system can be adapted to implement an embodiment of the method for making glass. Embodiments of the system can include a furnace having a plurality of zones that includes a first zone, a second zone, a third zone, a fourth zone, and a fifth zone. The first zone can be upstream of the fifth zone. The second zone can be between the first zone and the third zone, the third zone can be between the second zone and the fourth zone, and the fourth zone can be between the third zone and the fifth zone.

The system can also include an oxidant preheater positioned between a stack and the furnace. The oxidant preheater can be positioned to facilitate preheating of oxidant before the oxidant is fed to burners of the furnace via flue gas output from the furnace. A fuel preheater can be positioned between the stack and the furnace. The fuel preheater can be positioned to facilitate preheating of fuel before the fuel is fed to burners of the furnace via flue gas output from the furnace.

The first zone of the furnace can have at least one burner and the fifth zone of the furnace can have at least one burner. The at least one burner of the first zone can be configured to operate in a mode of operation in which an inner flow of fuel and an inner flow of oxidant are output into the first zone of the furnace between an upper oxidant conduit and a lower oxidant conduit such that a flame is formed to project into a combustion chamber of the furnace without upper oxidant staging via the upper oxidant conduit and without lower oxidant staging via the lower oxidant conduit while the oxidant is below a pre-selected hot oxidant temperature threshold. The at least one burner of the fifth zone can be configured to operate in a foam control mode of operation in which an upper oxidant flow is passed out of an upper oxidant conduit of the burner along with an inner flow of fuel and an inner flow of oxidant that are output into the fifth zone of the furnace so that combustion of the fuel from the at least one burner in the fifth zone of the furnace forms a flame that extends upwardly to provide a reducing atmosphere adjacent glass making material in the fifth zone of the furnace to dissolve foam back into the glass making material while the oxidant is below a pre-selected hot oxidant temperature threshold.

Embodiments of the system can be configured so that all the burners in the first zone operate in a same mode of operation. All the burners of the fifth zone can be configured to operate in the same foam control mode of operation.

In a tenth aspect, the system can be provided so that the at least one burner of the first zone is also configured to adjust operation in response to the furnace being at or above the pre-selected hot oxidant temperature threshold such that the at least one burner in the first zone of the furnace is adjusted to a split staging mode of operation in which oxidant is passed out of the lower oxidant conduit and is also passed out of the upper oxidant conduit in addition to the oxidant being passed out of the inner oxidant conduit and fuel being passed out of the inner fuel conduit. Alternatively, the at least one burner of the first zone can also be configured to adjust operation in response to the oxidant being at or above the pre-selected hot oxidant temperature threshold such that the at least one burner in the first zone of the furnace is adjusted to a mode of operation in which the flame has a radiative underside that is promoted via an oxidant flow passed out of the lower oxidant conduit without oxidant staging being provided via the upper oxidant conduit of the at least one burner of the first zone.

In an eleventh aspect, the system can include a fluid heater positioned to receive flue gas output from the furnace to heat a heating medium that is feedable to a glass making feed material pre-heating device. The fluid heater can be positioned between the stack and the furnace so that the fluid heater is downstream of the oxidant preheater and/or the fuel preheater in some embodiments. The glass making feed material pre-heating device can be positioned to receive a portion of the glass making material to preheat the portion of the glass making material and output the preheated portion of the glass making material for feeding to the first zone of the furnace.

In some embodiments, the glass making feed material pre-heating device can include a rotatable shaft having flights that are rotatable to pass the portion of the glass making material fed to the glass making feed material pre-heating device through the glass making feed material pre-heating device. A heat exchanger can be positioned to receive a slip stream of the heating medium outputtable from the fluid heater to heat air for feeding the heated air to a hollow shaft of the glass making feed material pre-heating device (e.g. the rotatable shaft having flights can be hollow to receive the heated air). The hollow shaft can have holes so that the heated air is passable into the portion of the glass making material as it passes through the glass making feed material pre-heating device.

In a twelfth aspect, the system can be provided so that the at least one burner of the fifth zone is also configured to adjust operation in response to the furnace being at or above the pre-selected hot oxidant temperature threshold such that the at least one burner in the fifth zone of the furnace is adjusted to a split staging mode of operation in which oxidant is passed out of the lower oxidant conduit and is also passed out of the upper oxidant conduit in addition to the oxidant being passed out of the inner oxidant conduit and fuel being passed out of the inner fuel conduit.

In a thirteenth aspect, embodiments of the system of the ninth aspect can include other elements or features. For example, embodiments of the system of the ninth aspect can include one or more features of the tenth aspect, eleventh aspect, or twelfth aspect. Embodiments of the system can also include process control elements. Examples of additional embodiments of the system can be appreciated from exemplary embodiments discussed herein, for instance.

In a fourteenth aspect, an apparatus for preheating glass making material to be fed to a furnace for being heated therein to make glass is provided. The apparatus can include a glass making feed material pre-heating device positioned to receive a portion of the glass making material to preheat the portion of the glass making material and output the preheated portion of the glass making material for feeding to the furnace. The glass making feed material pre-heating device can include a rotatable shaft having flights positioned in an inner conduit of the glass making feed material pre-heating device. The rotatable shaft can be connectable to a motor to drive rotation of the rotatable shaft for moving the portion of the glass making material through the glass making feed material preheating device. The glass making feed material preheating device can have an annular conduit that surrounds at least a portion of the inner conduit so that a heating medium is passable through the annular conduit to heat the portion of the glass making material passed through the inner conduit via rotation of the rotatable shaft.

Embodiments of the apparatus for preheating glass making material can be utilized in embodiments of the system for making glass and/or a method for producing glass.

Embodiments of the apparatus can include a motor that can be operatively coupled to the rotatable shaft to drive rotation of the shaft. In some embodiments, at least one coupling can be provided to facilitate the connection between the motor and the rotatable shaft to facilitate rotation of the shaft, for example.

In a fifteenth aspect, the apparatus for preheating glass making material can include a heat exchanger positioned to heat air to output heated air for feeding to the rotatable shaft. The rotatable shaft can be a hollow shaft that has holes. The hollow shaft can be configured to receive heated air from the heat exchanger for passing the heated air into the inner conduit via the holes of the hollow shaft.

In a sixteenth aspect, the apparatus for preheating glass making material can also include other features. For example, the apparatus of the fourteenth aspect can include one or more features of the fifteenth aspect and/or other elements or features. Examples of additional embodiments of the apparatus for preheating glass making material can be appreciated from exemplary embodiments discussed herein, for instance.

It should be appreciated that embodiments can utilize various different conduit arrangements and process control elements. The embodiments may utilize sensors (e.g., pressure sensors, temperature sensors, flow rate sensors, concentration sensors, etc.), controllers, valves, piping, and other process control elements. Some embodiments can utilize an automated process control system and/or a distributed control system (DCS), for example. Various different conduit arrangements and process control systems can be utilized to meet a particular set of design criteria.

Other details, objects, and advantages of processes for operating burners for glass making, processes for glass making, apparatuses for glass making, and devices for glass making and methods of making and using the same will become apparent as the following description of certain exemplary embodiments thereof proceeds.

BRIEF DESCRIPTION OF THE DRAWINGS

Exemplary embodiments of apparatuses for glass making, processes for glass making, devices for glass making, process and apparatuses for controlling burners for glass making, and methods of making and using the same are shown in the drawings included herewith. It should be understood that like reference characters used in the drawings may identify like components.

DETAILED DESCRIPTION OF THE INVENTION

Figure 1:
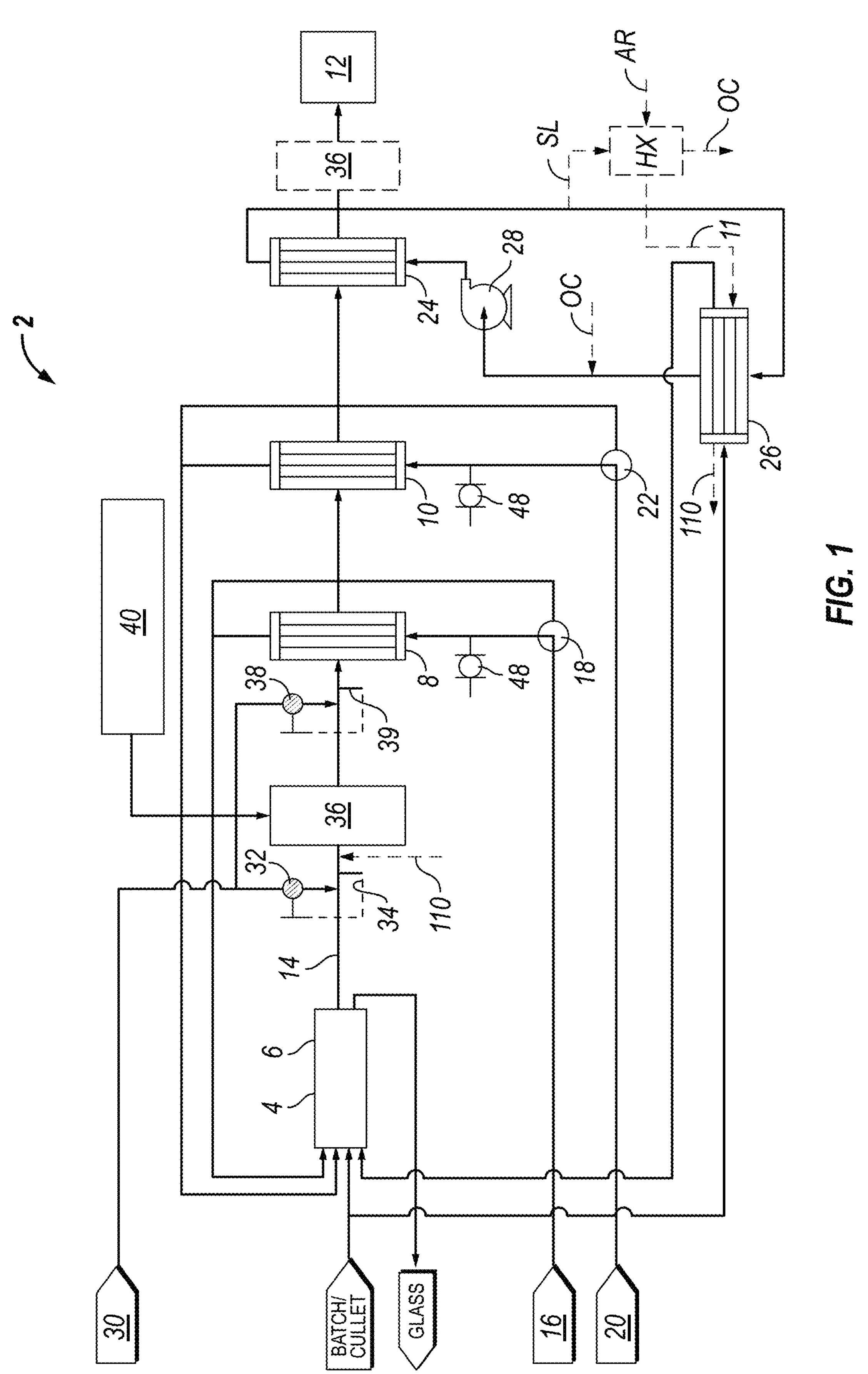
FIG. 1 is a schematic block diagram of a first exemplary embodiment of an apparatus for glass making. An exemplary embodiment of a process for making glass that can be performed by this embodiment is also illustrated in FIG. 1.

Referring to FIGS. 1-4, exemplary embodiments of an apparatus for glass making can be configured as a system 2 for making glass. The system 2 can include a glass furnace 4 comprising at least one burner 6, an oxidizer heater 8, a fuel heater 10, and a stack 12. A flue gas conduit arrangement 14 can be positioned between the furnace 4 and the stack 12 to route the flue gas output from the furnace 4 to the stack 12 for being emitted to atmosphere. The apparatus can also include a glass material pre-heater device 26 positioned to preheat at least a portion of a feed of glass making material before that material is fed to the furnace 4.

Embodiments can also include other elements. For example, the system 2 can also include a pollution control device 36, a source of sulfur reagent 40, a nitrous oxide (NOx) reagent source 42, and/or a source of a cooling medium 30. The system 2 can also include a source of glass making feed material (BATCH/CULLET), a source of fuel 20 to feed to burners 6 of the furnace, a source of oxidant 20 to feed to the burners 6 and/or furnace 4 for combustion of the fuel for heating the glass making feed material in the furnace 4.

The furnace 4 can be configured to receive the glass making material for heating that material within the furnace via one or more flames FL generated by burners 6 positioned in or adjacent sidewalls, end walls and/or a roof of the furnace 4. The flames FL can be formed via combustion of fuel fed to the burners for being output into the combustion chamber of the furnace 4. Oxidant from the source of oxidant 20 can be fed to the burners 6 for facilitating combustion of the fuel to form the flames FL.

The burners 6 can be oxy-fuel burners, transient heating burners, or other suitable burners. The oxidant can be air, oxygen enriched air, or other oxidant. The fuel can be natural gas or other suitable fuel for combustion of the fuel to form a flame FL.

The glass making material (BATCH/CULLET) can include sand, soda ash, limestone, dolomite, feldspar, rouge, cullet, or combinations thereof. The glass making material can also include other raw materials (e.g. additives, etc.). The furnace 4 can be configured to heat the glass making material as it is passed through the furnace so that the furnace outputs glass (GLASS) as a finished product. The glass that is output can subsequently be further cooled, polished, cut and/or otherwise processed for storage and/or supply. The formed glass can be suitable for use and/or manufacturing to be incorporated into finished products (e.g. windshields, windows, etc.)

The source of fuel 20 can be positioned to feed fuel to the burners 6 of the furnace 4 via a fuel supply conduit arrangement. A compressor, fan or other type of flow driving mechanism can be utilized to facilitate the flow of the fuel to the burners 6.

This fuel supply conduit arrangement can include a valve 22 to control a flow of fuel so that a portion of fuel is passable to the burner(s) 6 without being preheated and a portion of fuel can also (or alternatively) be passed through a fuel preheater 10 to be heated upstream of the burners 6 between the source of the fuel 20 and the burners 6 via heat from flue gas passed through the fuel preheater 10. The heat from the flue gas can be captured at least partially via the fuel preheater to provide preheating to the fuel for being fed to the burners 6 for being combusted in the combustion chamber of the furnace 4 for formation of flames FL. The preheating of the fuel can be performed via valve 22 so that the valve is in a first position in which none of the fuel is preheated, a second position in which all the fuel is passed through the fuel preheater 10 for preheating, and at least one third position in which a preheating portion of the fuel is passed through the fuel preheater 10 for preheating and a non-preheating portion of the fuel bypasses the fuel preheater 10 via a fuel preheater bypass conduit so that portion of the fuel does not undergo preheating prior to being fed to the burner(s) 6. The preheated portion and non-preheated portions can be mixed via an inline mixer or other fuel mixing device connected to the fuel preheater bypass conduit and the outlet of the fuel preheater 10. This mixing device can be positioned between an outlet of the fuel preheater 10 and the burners 6 for merging the flows of fuel for feeding the fuel to the burners 6.

In some embodiments, the valve 22 can include multiple valves (e.g. a first valve in a fuel preheater feed conduit and a second valve in the fuel preheater bypass conduit). These valves can be adjustable between opened and closed positions to provide preheated and/or non-preheated fuel portions instead of use of a single multiple position valve.

The source of oxidant 16 can feed oxidant (e.g. air, oxygen enriched air, commercially pure oxygen, etc.) to the burners 6 of the furnace and/or to other outlets for oxidant in the furnace 4 to supply oxidant to the furnace 4 to aid in the combustion of the fuel and/or generation of flames FL in the combustion chamber of the furnace 4. A compressor, fan or other type of flow driving mechanism can be utilized to facilitate the flow of the oxidant to the burners 6 and/or furnace 4.

An oxidant supply conduit arrangement can be positioned between the source of the oxidant 16 and the burners 6 and/or furnace 4 so that the oxidant can be fed to an oxidant preheater 8 positioned between the source of oxidant 16 and the burners 6 so that the oxidant can be preheated via flue gas output from the furnace 4 before the flue gas is output via stack 12. The flue gas can be utilized as a heating medium to preheat the oxidant.

For example, the oxidant supply conduit arrangement can include a valve 18 to control a flow of oxidant so that a portion of the oxidant is passable to the burner(s) 6 without being preheated and a portion of oxidant can also (or alternatively) be passed through an oxidant preheater 8 to be heated upstream of the burners 6 between the source of the oxidant 16 and the burners 6 via heat from flue gas passed through the oxidant preheater 8. The heat from the flue gas can be captured at least partially via the oxidant preheater 8 to provide preheating to the oxidant for being fed to the burners 6 for facilitating combustion of the fuel in the combustion chamber of the furnace 4 for formation of flames FL. The preheating of the oxidant can be facilitated via valve 18 so that the valve 18 is in a first position in which none of the oxidant is preheated, a second position in which all the oxidant is passed through the oxidant preheater 8 for preheating, and at least one third position in which a preheating portion of the oxidant is passed through the oxidant preheater 8 for preheating and a non-preheating portion of the oxidant bypasses the oxidant preheater 8 so it does not undergo preheating prior to being fed to the burner(s) 6. The preheated portion and non-preheated portions can be mixed via an inline mixer or other oxidant mixer that is connected to the oxidant bypass conduit and the outlet of the oxidant preheater 8. This mixing device can be positioned between an outlet of the oxidant preheater 8 and the burners 6 for merging the flows of oxidant for feeding the oxidant to the burners 6 and/or the furnace 4.

In some embodiments, the valve 18 can include multiple valves (e.g. a first valve in an oxidant preheater feed conduit and a second valve in the oxidant preheater bypass conduit). These valves can be adjustable between opened and closed positions to provide preheated and/or non-preheated oxidant portions instead of use of a single multiple position valve.

The source of glass making material (BATCH/CULLET) can include solid material, which may be in particulate form or other type of relatively dry bulk form (e.g. in pellets, chunks, finely ground, particulate sized, etc.). The source of glass making material can be connected to the furnace 4 for feeding the glass making material to the furnace for being melted therein for forming glass to be output from the furnace 4 via a glass making material feed conduit arrangement positioned between the source of the glass making material and the furnace 4.

At least some of the glass making material can be fed to a glass making feed material pre-heating device 26 that is positioned between the furnace 4 and the source of glass making material (BATCH/CULLET). The glass making feed material pre-heating device 26 can be positioned so that it may be optionally used. At startup when a furnace is cold, no material may be fed to the glass making feed material pre-heating device 26. After the furnace has been started and combustion has occurred, at least a portion of the glass making material can be fed to the glass making feed material pre-heating device 26 for preheating that material before it is fed to the furnace 4. A motor-driven conveyor or other glass making material feed drive mechanism can be utilized to help drive the flow of the glass making material to the furnace 4 and/or the glass making feed material pre-heating device 26.

The glass making feed material pre-heating device 26 can utilize a heating medium that can be heated via heat from the flue gas that can be passed through a fluid heater 24 that is positioned between the furnace 4 and the stack 12 so that it can utilize heat from the flue gas to heat the heating medium to be utilized to heat the glass making material in the glass making feed material pre-heating device 26. For example, the fluid heater 24 can receive a flow of a heating medium (e.g. a suitable heat transfer fluid for receiving heat from the flue gas via the fluid heater 24 and providing that heat to heat the glass making material passed through the glass making feed material pre-heating device 26, examples of such a heat transfer fluid can include a heating oil, DOWTHERM A available from The Dow Chemical Company, a glycol based heat transfer fluid, etc.). The heated heating medium can be output from the fluid heater 24 and fed to the glass making feed material pre-heating device 26 for passing through an outer conduit **26*d* that surrounds an inner conduit 26*e* through which the glass making material is passed. The heating medium can pass through the outer conduit 26*d* in countercurrent flow arrangement as compared to the glass making material passed through the inner conduit 26*e* of the glass making feed material pre-heating device 26 or the heating medium can be passed through the outer conduit 26*d* in a co-current flow arrangement with the glass making material passed through the inner conduit 26*e* of the glass making feed material pre-heating device 26**.

The heating medium that is cooled via heating of the glass making material can be output from the glass making feed material pre-heating device 26 for being fed to the fluid heater 24 for being reheated for subsequent use in a closed circuit arrangement. A pump 28 of other heating medium fluid drive mechanism can be connected to the heating medium conduit arrangement positioned between the fluid heater 24 and the glass making feed material pre-heating device 26 to facilitate the flow of the heating medium for use in the glass making feed material pre-heating device 26.

Figure 11:
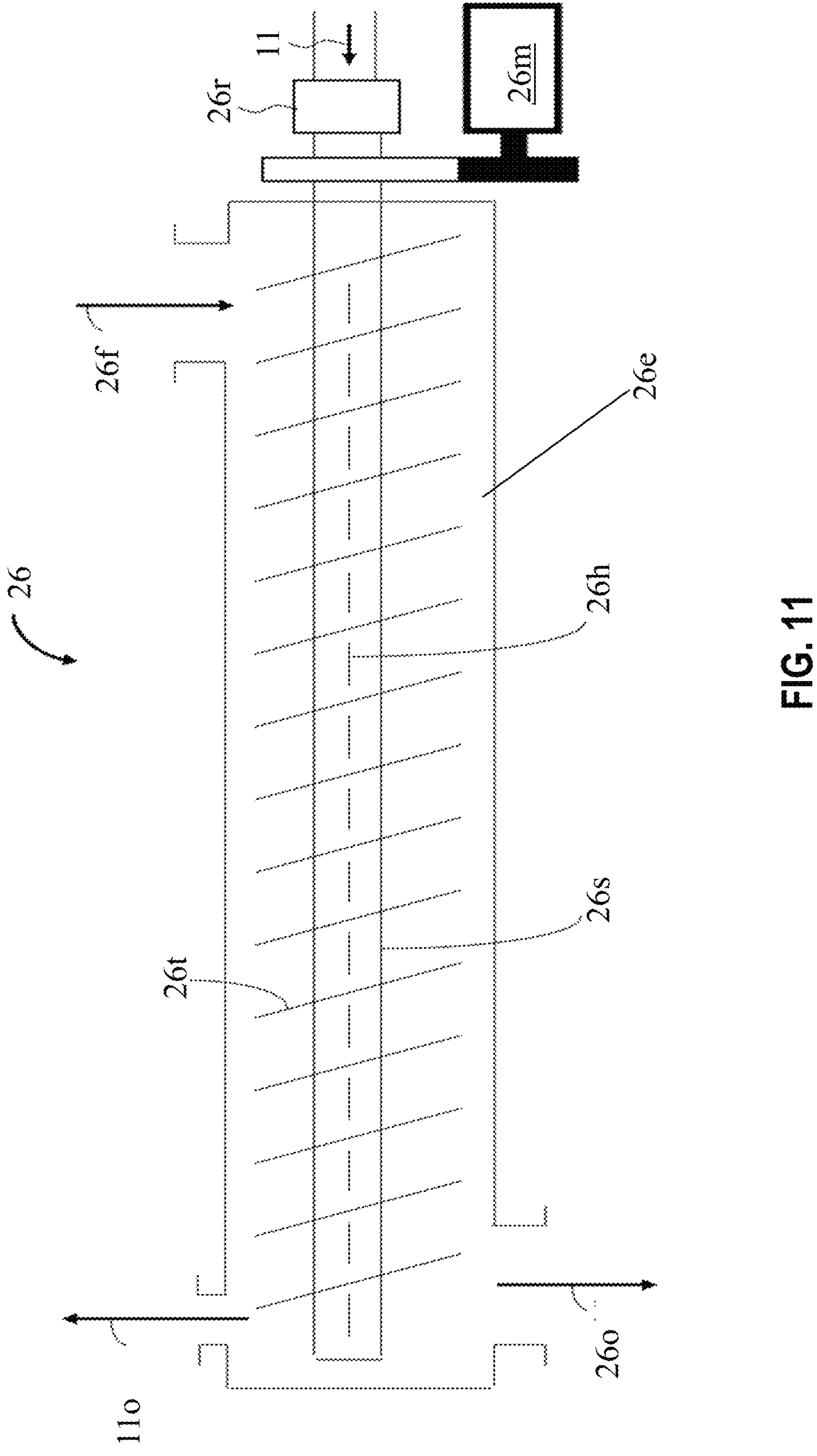
FIG. 11 is a side cross-sectional schematic view of an embodiment of a glass making feed material pre-heating device 26 that can be utilized in the first, second, third and fourth exemplary embodiments of the apparatus shown in FIGS. 1, 2, 3, and 4. An outer conduit **26*d*** through which heated fluid can pass for heating of material is omitted from this illustration.
Figure 12:
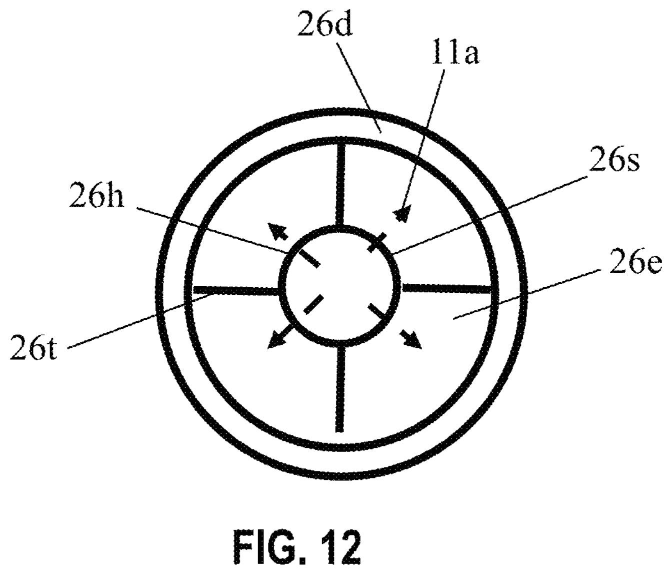
FIG. 12 is an end cross-sectional schematic view of the exemplary embodiment of the glass making feed material pre-heating device 26 shown in FIG. 11.

As may best be seen from FIGS. 11 and 12, the glass making feed material pre-heating device 26 can have an inlet through which glass making material can be fed into the inner conduit 26*e* of the glass making feed material pre-heating device 26 as a flow of feed 26*f*. The glass making feed material pre-heating device 26 can include a rotatable shaft 26*s* that has flights 26*t* that extend from the shaft that can be rotated via rotation of the shaft 26*s* to help drive the flow of the glass making material through the inner conduit 26*e* to an outlet of the glass making feed material pre-heating device 26 through which a preheated flow of glass making material 260 can pass for being fed to the furnace 4.

The shaft 26*s* of the glass making feed material pre-heating device 26 can be hollow to permit a heated air flow 11 to be passed through the shaft 26*s*. The shaft 26*s* can have holes 26*h* in communication with the hollow cavity of the shaft 26*s* through which the heated air flow passes to permit the heated air flow 11*a* passing through the shaft 26*s* to be passed out of the holes 26*h* of the shaft 26*s* and into the inner conduit 26*e* to mix with the glass making material passing through the inner conduit 26*e* via rotation of the shaft 26*s* having the flights 26*t* (e.g. as indicated by arrows in FIG. 12). The heated air may help heat the glass making material. The heated air flow can be provided at a sufficient velocity to prevent back migration of the solid glass making material in the inner conduit 26*e*. The velocity of the heated air 11 passed through the shaft 26*s* and out of holes 26*h* can also be sufficiently low so that fluidization of the solid material does not occur during transport through the glass making feed material pre-heating device 26 and so that the glass making material has sufficient residence time in the glass making feed material pre-heating device 26 to be heated via the heating medium passed through the outer conduit 26*d* that encircles the inner conduit 26*e* to preheat the glass making material to a desired pre-selected preheated temperature. The heated air passed through the glass making feed material pre-heating device 26 can be output from an outlet of the glass making feed material pre-heating device 26 as a cooled air flow 110. This cooled air flow 110 may still be partially warm and can be passed to the flue gas conduit arrangement 14 as shown in broken line in FIGS. 1, 2, 3, and 4 for being passed through one or more preheaters and/or the fluid heater 24 before being passed to the stack 12.

The glass making feed material pre-heating device 26 can include a motor 26*m* that can be coupled to the shaft 26*s* to rotate the shaft 26*s*. A rotary coupling 26*r* can be positioned to connect the motor 26*m* to the shaft 26*s* so that the motor can drive rotation of the shaft 26*s* at a desired rotational speed, while the heated air flow 11 can be introduced into the hollow cavity of shaft 26*s* from a non-rotating conduit. The rotational speed of shaft 26*s* can be a pre-selected speed to facilitate a desired level or residence time in the glass making feed material pre-heating device 26 for preheating of the glass making material.

The heated air flow 11 can be provided by a compressor, fan or other source of air feeding a flow of air AR through a heat exchanger HX that utilizes a slip stream SL of the heating medium as a heating medium for preheating the air to output the heated air flow 11 for feeding to the shaft 26*s* of the glass making feed material pre-heating device 26. The heated air flow 11 output from the heat exchanger HX can be fed to the glass making feed material pre-heating device 26 for being fed into the hollow shaft 26*s*. The cooled heating medium passed through the heat exchanger HX can be output from the heat exchanger HX as cooled heating medium OC and be subsequently fed to the heating medium conduit arrangement at a location between the fluid heater 24 and the glass making feed material pre-heating device 26 for mixing with the cooled heating medium output from the glass making feed material pre-heating device 26 for being fed to the fluid heater 24.

As shown in broken line in FIGS. 1, 2, 3, and 4, a slip stream heating medium conduit arrangement can be positioned between the heat exchanger HX and the fluid heater 24 to facilitate the flow of the slip stream SL of the heating medium. The slip stream heating medium conduit arrangement can include a valve positioned to control the flow rate of the heating medium that is passed through the slip stream conduit arrangement for passing through the heat exchanger HX for heating an air flow AR. An air flow conduit arrangement can be positioned between the glass making feed material pre-heating device 26 and the flue gas conduit arrangement 14 for providing the air output from the glass making feed material pre-heating device 26 to the flue gas conduit 14. A glass making feed material pre-heating device 26 air feed conduit can be positioned between the heat exchanger HX and the glass making feed material pre-heating device 26 for feeding the heated air flow to the glass making feed material pre-heating device 26 for being passed through the shaft 26*s* and into the inner conduit 26*e* of the glass making feed material pre-heating device 26.

In some embodiments, the flue gas conduit arrangement 14 can be positioned so that flue gas output from the furnace 4 passes through the oxidant preheater 8, then the fuel preheater 10, and then the fluid heater 24. After the flue gas is output from the glass making feed material pre-heating device 26, the flue gas can be passed to the stack 12 or can be passed to a pollution control unit 36 positioned between the stack 12 and the glass making feed material pre-heating device 26. The pollution control unit 36 can alternatively be positioned in another location between the stack 12 and the furnace 4. For example, the pollution control unit 36 can be positioned between the furnace 4 and the oxidant preheater 8 to treat the flue gas before the flue gas is passed through the oxidant preheater 8, fuel preheater 10 and the fluid heater 24.

Figure 2:
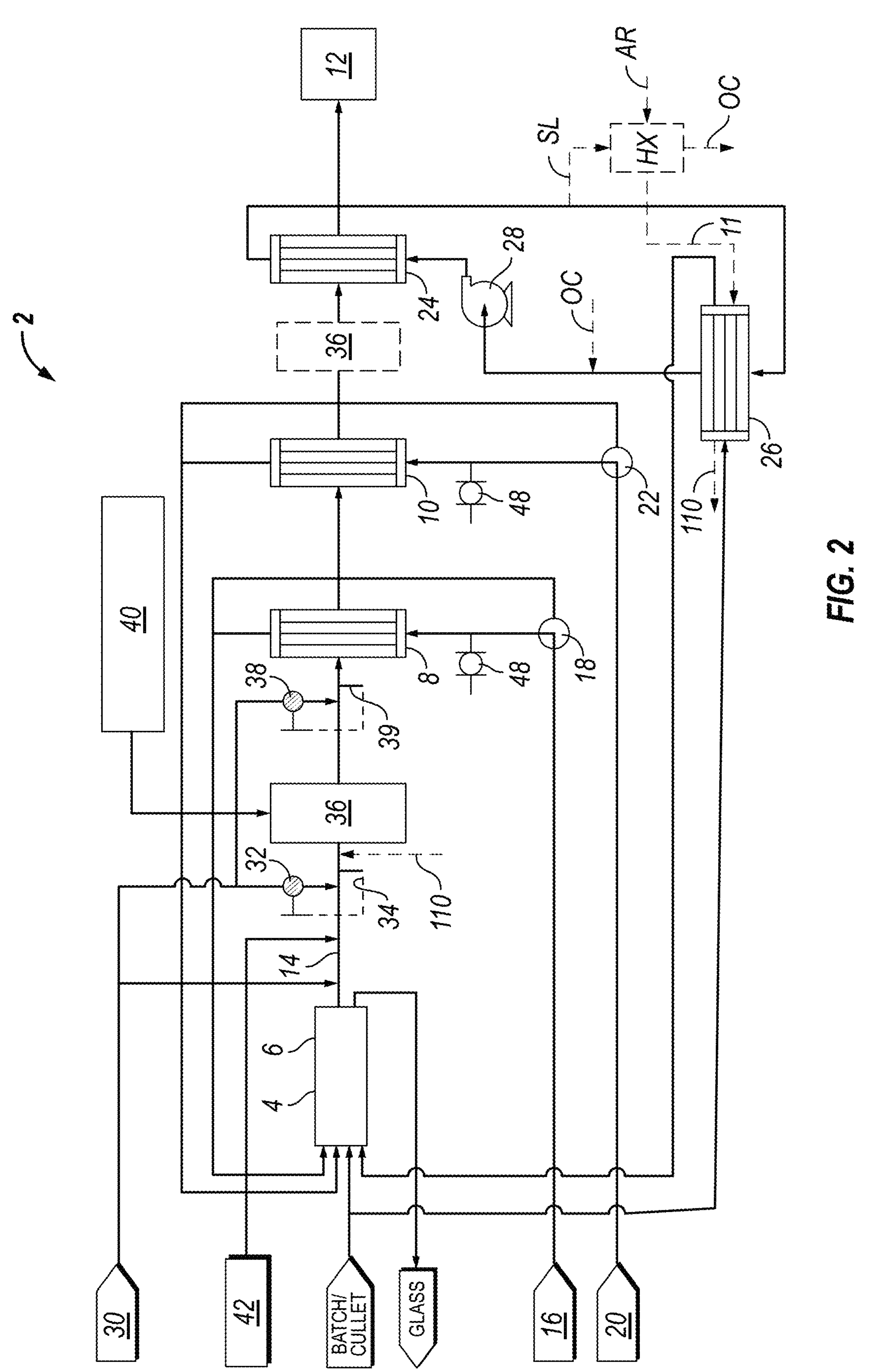
FIG. 2 s a schematic block diagram of a second exemplary embodiment of an apparatus for glass making. An exemplary embodiment of a process for making glass that can be performed by this embodiment is also illustrated in FIG. 2.

In some embodiments, there can be a first pollution control unit 36 positioned upstream of the oxidant preheater 8, fuel preheater 10, and fluid heater 24 and a second pollution control unit 36 positioned downstream of these heat exchangers so that the second pollution control unit 36 is between the stack 12 and the fluid heater 24 (e.g. broken line second pollution control unit 36 shown in FIG. 1) or is between the stack 12 and the fuel preheater 10 (e.g. broken line second pollution control unit shown in FIGS. 1 and 2). In such embodiments, the first pollution control unit can be configured to limit or avoid fouling of the heat exchangers and the second pollution control unit can be configured to remove particulates that may be present via the injection of reagents to remove sulfur and/or NOx from the flue gas (e.g. the second pollution control unit 36 can include a particulate removal mechanism and the first pollution control device 36 can be configured for sulfur removal and/or removal of other fouling elements from the flue gas output from the furnace 4).

In other embodiments, there can be a first pollution control unit 36 positioned upstream of the oxidant preheater 8, fuel preheater 10, and fluid heater 24 and a second pollution control unit 36 positioned between the fluid heater 24 and the fuel preheater 10 as shown in broken line in FIG. 2. In such embodiments, the positioning of the second pollution control unit 36 can permit the flue gas being at a sufficiently high temperature to facilitate sulfur and NOx removal before being fed to the fluid heater 24. This type of arrangement may be desired in situations where the flue gas could be output from the fluid heater 24 at a temperature that is too low for sufficient operation of a pollution control unit 36, for example.

The pollution control unit 36 can be connected to a source of sulfur reagent 40 that can be positioned and configured to feed sulfur reagent to the pollution control unit 36 to help reduce the levels of sulfur in the flue gas. For example, the source of sulfur agent 40 can include calcium or sodium containing compounds such as sodium sesquicarbonate dihydrate, etc. for use in the pollution control unit to remove sulfur from the flue gas. The sulfur reagent from the source of sulfur reagent can be fed to the pollution control unit 36 via a sulfur reagent feed conduit positioned between the source of the sulfur regent 40 and the pollution control unit 36.

A source of NOx reagent 42 can be connected to the flue gas conduit arrangement 14 to supply at least one type of NOx reagent to the flue gas passing from the furnace 4 to the stack 12 to reduce the level of NOx in the flue gas. The NOx reagent can include urea and/or ammonia, for example. A NOx reagent feed conduit can be positioned between the source of the NOx reagent 42 and the flue gas conduit arrangement 14 for feeding the NOx reagent to the flue gas passing from the furnace 4 to the stack 12 to reduce the level of NOx in the flue gas. In some embodiments, the NOx reagent can be fed to the flue gas conduit arrangement so the NOx reagent is injected into the flue gas between the furnace 4 and the oxidant preheater 8 and/or between the furnace 4 and the pollution control unit 36.

The system can also utilize a source of a cooling medium 30. In some embodiments, the cooling medium can include air, partially cooled and recirculated flue gas, or water, for example. The source of cooling medium 30 can be connected to the flue gas conduit arrangement 14 via a cooling medium feed conduit arrangement positioned between the source of the cooling medium 30 and the flue gas conduit arrangement 14 for feeding the cooling medium to the flue gas at one or more locations between the furnace and the stack 12 to help cool the flue gas to a more desired temperature. The addition of water or other cooling medium to the flue gas can also be provided to facilitate NOx removal, sulfur removal, or other pollution control processing as well.

The cooling medium feed conduit arrangement can include a first control valve 32 and a second control valve 38 for adjusting a flow of cooling medium to the flue gas at different locations. The first control valve 32 can be communicatively connected to a first flue gas temperature sensor 34 that can be positioned to detect a temperature of the flue gas upstream of the pollution control unit 36 and/or upstream of the oxidant preheater 8. The first control valve 32 can be adjusted from a closed position to a fully open position (e.g. fully closed, at least one intermediate partially open position, a fully opened position, etc.) to control a flow of the cooling medium to the flue gas upstream of the pollution control unit 36 and/or oxidant preheater 8 so that the flue gas passed downstream of a first cooling medium injection location is at or below a pre-selected temperature that is suitable for being fed to the downstream elements.

The second control valve 38 can be positioned to control an injection of the cooling medium upstream of the oxidant preheater 8 and downstream of a first location that may be controlled via the first control valve 32. The second control valve 38 can be communicatively connected to a second flue gas temperature sensor 35 that can be positioned to detect a temperature of the flue gas upstream of the oxidant preheater 8. The second control valve 38 can be adjusted from a closed position to a fully open position (e.g. fully closed, at least one intermediate partially open position, a fully opened position, etc.) to control a flow of the cooling medium to the flue gas upstream of the oxidant preheater 8 so that the flue gas passed downstream of a second cooling medium injection location is at or below a pre-selected temperature that is suitable for being fed to the downstream elements.

In some embodiments, there may only be control valve 38 located upstream of the oxidant preheater 8. In such embodiments, this control valve may be considered a first control valve. In a situation where the pollution control unit 36 is further downstream and located closer to the stack 12, the cooling medium feed conduit can be configured to feed a cooling medium upstream of the pollution control unit 36 and downstream of the fluid heater 24 and/or fuel preheater 10 and/or oxidant preheater 8. A control valve can be positioned to adjustably control the feed of the cooling medium injected into the flue gas upstream of the pollution control unit in such an embodiment. A temperature sensor positioned upstream of the pollution control unit can be utilized to detect a temperature of the flue gas for providing data to the control unit to facilitate a control of the flow of the cooling medium to be injected at this location as well.

Figure 3:
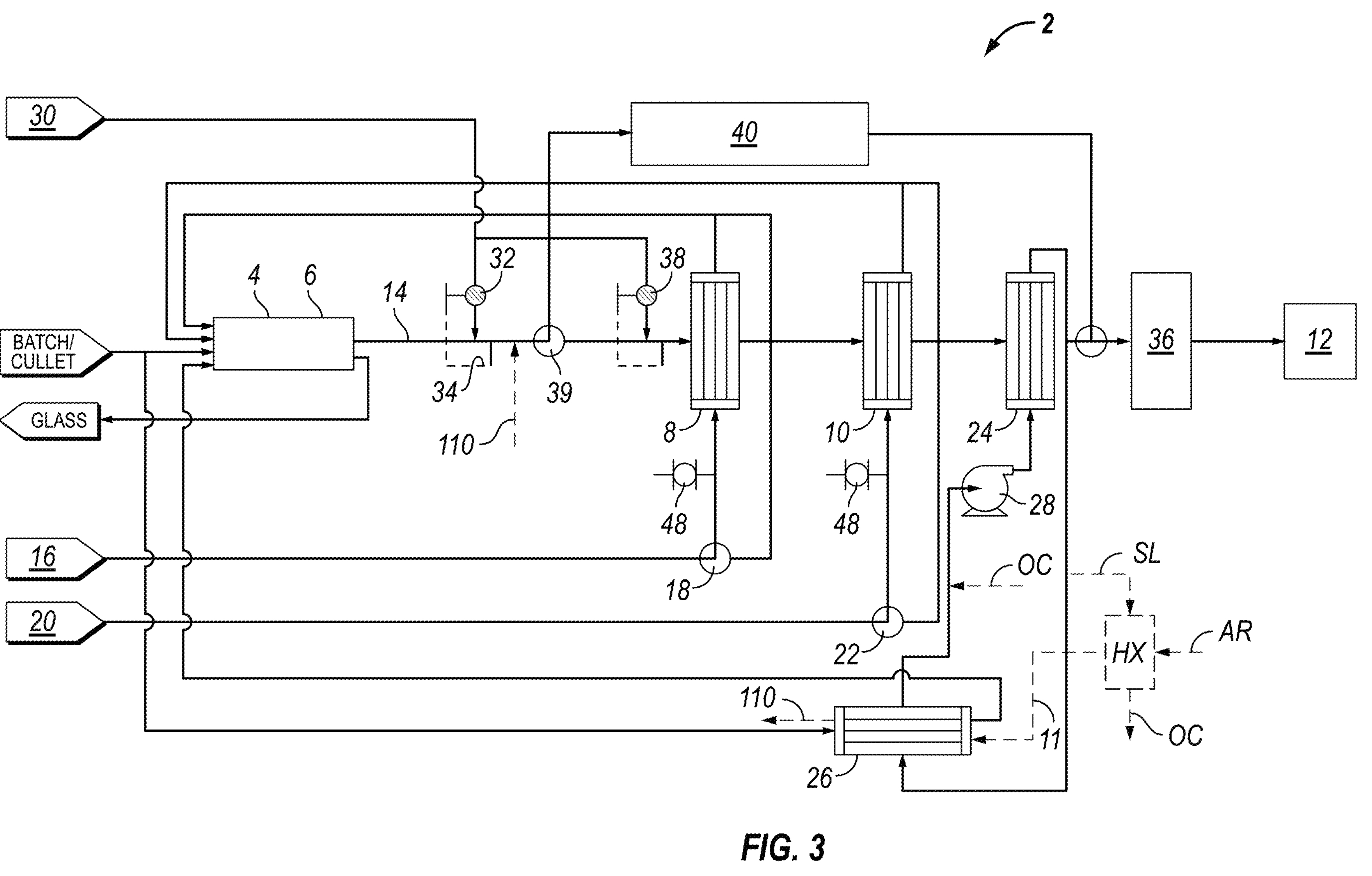
FIG. 3 s a schematic block diagram of a third exemplary embodiment of an apparatus for glass making. An exemplary embodiment of a process for making glass that can be performed by this embodiment is also illustrated in FIG. 3.
Figure 4:
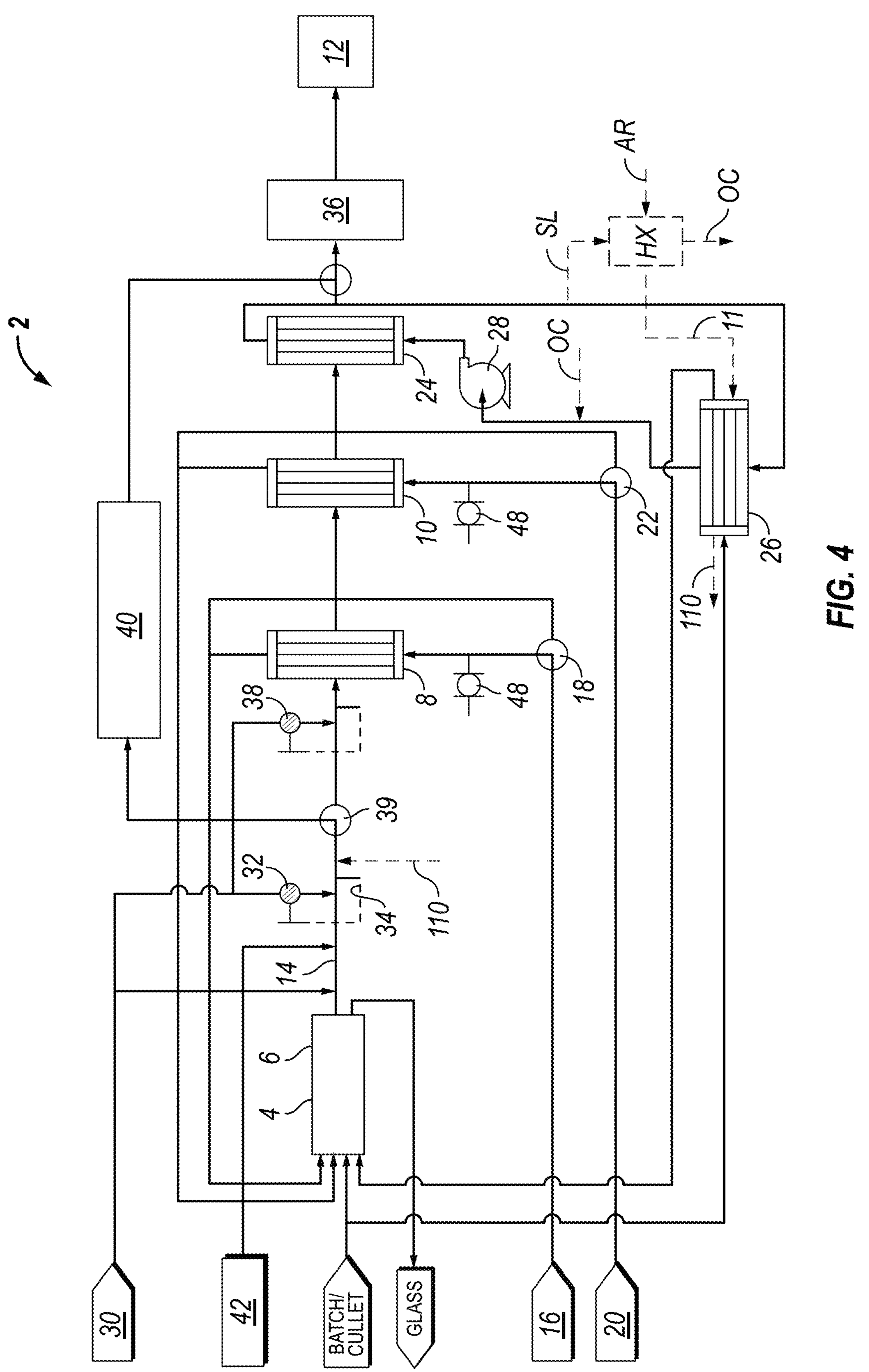
FIG. 4 is a schematic block diagram of a fourth exemplary embodiment of an apparatus for glass making. An exemplary embodiment of a process for making glass that can be performed by this embodiment is also illustrated in FIG. 4.
Figure 5:
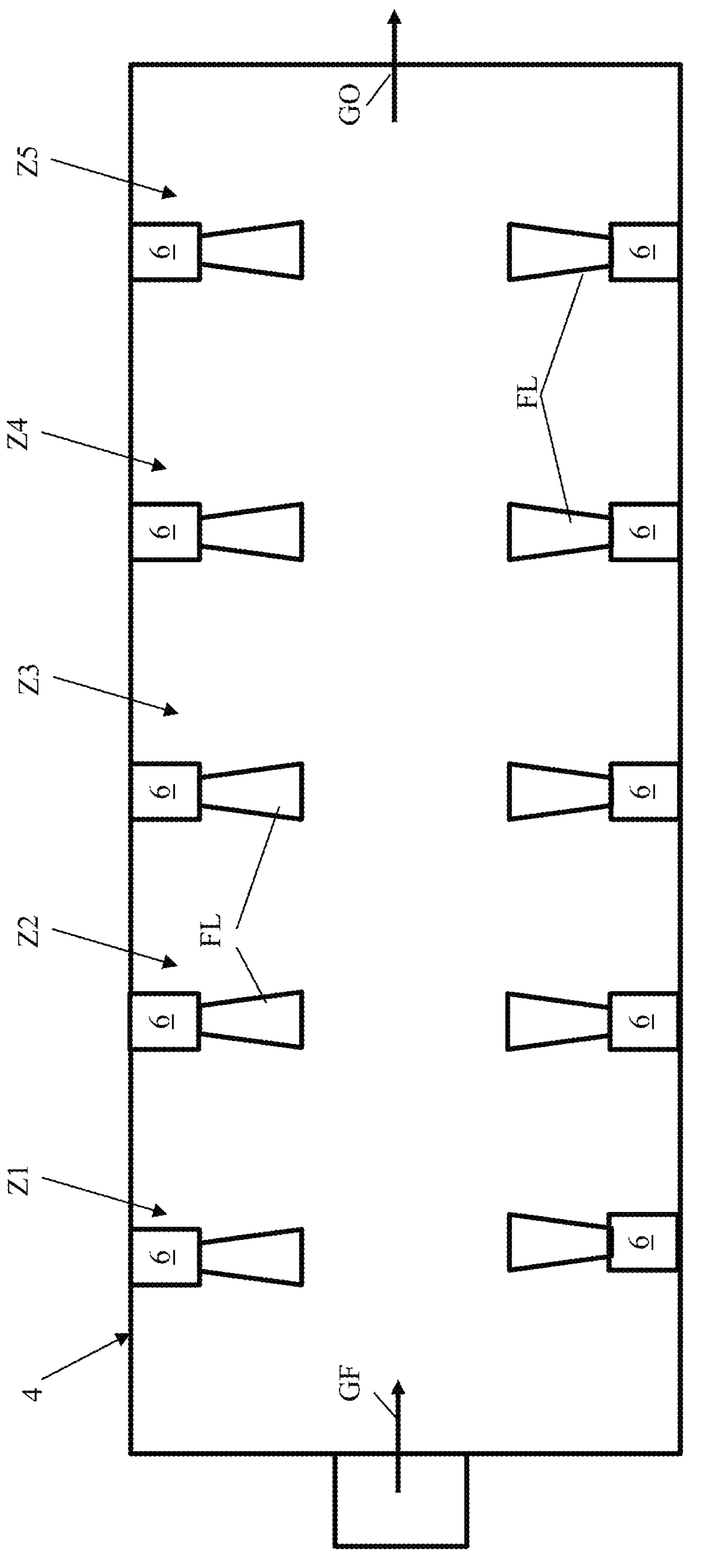
FIG. 5 is a schematic illustration of an exemplary embodiment of a furnace 6 having burners 6 that can be utilized in the first, second, third and fourth exemplary embodiments of the apparatus shown in FIGS. 1, 2, 3, and 4.

As may best be appreciated from FIGS. 3 and 4, the flue gas conduit arrangement 14 can include a preheater bypass conduit that can be positioned to extend from a bypass valve 39 of the flue gas conduit arrangement to a position downstream of the oxidant preheater 8, fuel preheater 10 and/or fluid heater 24 so hotter flue gas can avoid being passed through these heat exchangers. The bypass valve 39 can be adjusted between a fully opened and a fully closed position so that all the flue gas can bypass these heat exchangers while the valve is in the fully open position and none of the flue gas may bypass these heat exchangers when the valve is in a fully closed position. The bypass valve 39 can also have one or more intermediate positions so a bypass portion of the flue gas can bypass the heat exchangers and another portion of the flue gas can be passed through the oxidant preheater 8, fuel preheater 10, and fluid heater 24.

In embodiments in which the pollution control unit 36 is upstream of the heat exchangers, the bypass valve 39 can be positioned between the pollution control unit 36 and the heat exchangers (e.g. oxidant preheater 8, fuel preheater 10 and fluid heater 24). In other embodiments, the preheater bypass conduit of the flue gas conduit arrangement 14 can be positioned so that the flue gas that bypasses the heat exchangers is fed to the pollution control unit 36. An example of such an arrangement is shown in FIG. 4.

The cooled air flow 110 output from the glass making feed material pre-heating device 26 can be fed to the flue gas conduit arrangement 14 upstream of the bypass valve 39. As the cooled air flow 110 may contain some entrained dust from contact with the glass making material in the glass making feed material preheater 26, the position at which the cooled air flow 110 is fed into the flue gas conduit arrangement 14 can be upstream of the pollution control unit 36 as well as one or more of the preheaters and/or fluid heater 24.

Embodiments of the system 2 can also utilize one or more purge block valves 48. The purge block valves 48 can be positioned at various points in the system 2 to enable a flow of purge gas to flow through various units (e.g., the oxidant preheater 8 and fuel preheater 10). In certain instances, the function of the purge gas is to remove any residual oxidant in the oxidant preheater 8 or fuel preheater 10 immediately following an emergency shutdown of the system 2 to reduce the likelihood of an unwanted ignition. Additionally, the purging can also function to remove any residual oxygen that may have diffused upstream during the emergency shutdown event. Nitrogen, or other suitable gas can be used as a purge gas.

The purge block valves 48 can also be configured for coupling to one or more other valves in the outlet of the heated oxidant or fuel conduits so that if the oxidant or fuel is bypassed around its respective preheater and one or more of the additional outlet valves is closed, then a pressurized fluid can be fed through the purge block valve 48 to pressurize the internal conduits of the preheater. Then the purge block valve 48 can be closed and pressure can be measured (measurement device not shown) over time to determine whether a conduit leak exists for the preheater, preheater inlet, or preheater outlet.

In some embodiments, changes in the flue gas temperature, pressure, or composition can be detected via at least one sensor in the oxidant preheater 8 or downstream of the oxidant preheater 8 to detect a leak in oxidant that may occur and need addressed. Also, changes in the flue gas temperature, pressure, or composition can be detected via at least one sensor in the fuel preheater 10 or downstream of the fuel preheater 10 to detect a leak in fuel that may occur and need addressed.

There can be one or more temperature sensors positioned to monitor the temperature of the furnace 4 and the flue gas as it passes through the flue gas conduit arrangement. The temperature of the flue gas can be utilized to adjust to what extent the oxidant and fuel are preheated and to what extent the flue gas bypasses any heat exchangers.

As may best be appreciated from FIGS. 5-10, the burners 6 can be arranged in the furnace to emit flames FL in the combustion chamber of the furnace to melt the glass making material to form glass that can be output from the furnace. The burners 6 can be arranged in different zones that can include a first zone Z1, second zone Z2, third zone Z3, fourth zone Z4, and fifth zone Z5. There can be less than 5 zones or more than 5 zones in different embodiments. The first zone Z1 can be closest to a glass making material feed inlet GF in which glass making material from the glass making feed material pre-heating device 26 and/or source of glass making material (BATCH/CULLET) is fed into the furnace. The fifth zone can be downstream of the first zone Z1 and can be positioned by an outlet through which a glass output stream of glass GO can be output from the furnace 4. In embodiments that may only have two zones (e.g. a first zone and a second zone the fifth zone Z5 may be the final downstream zone and be considered the second zone and the first zone Z1 can be considered the upstream zone that extends from a feed inlet of the furnace to the second downstream zone). The glass making material can transition from a solid state to a molten state, and subsequently to a formed glass state as it passed from the upstream first zone Z1 to the downstream zone of the furnace for being output from the furnace as formed glass.

Figure 6:
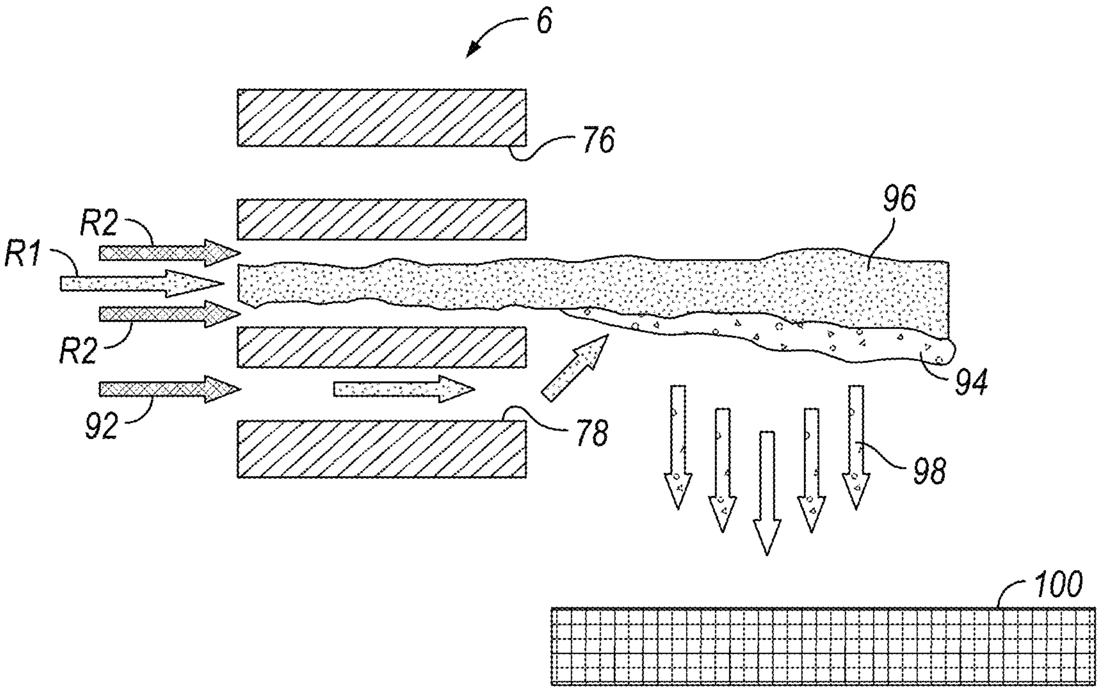
FIG. 6 is a side cross-sectional schematic view of an exemplary embodiment of a burner 6 in a first mode of operation that can be used in the first, second, third and fourth exemplary embodiments of the apparatus shown in FIGS. 1, 2, 3, and 4.
Figure 7:
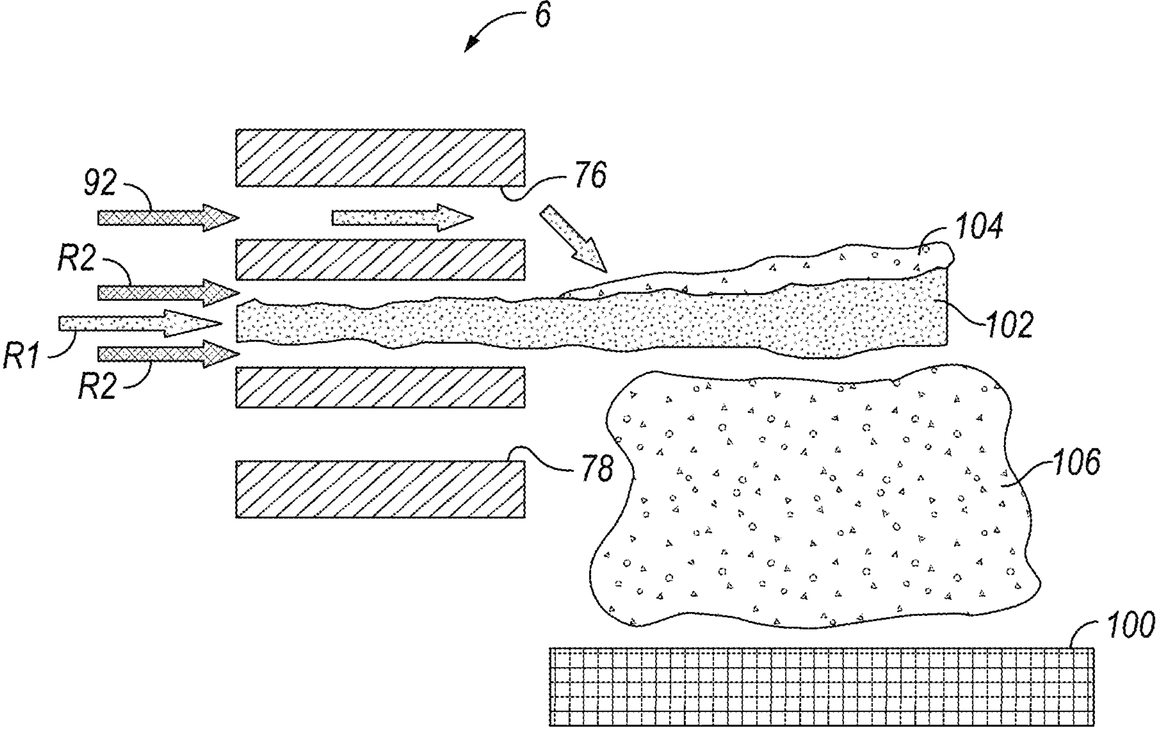
FIG. 7 is a side cross-sectional schematic view of an exemplary embodiment of a burner 6 in a second mode of operation that can be used in the first, second, third and fourth exemplary embodiments of the apparatus shown in FIGS. 1, 2, 3, and 4.
Figure 8:
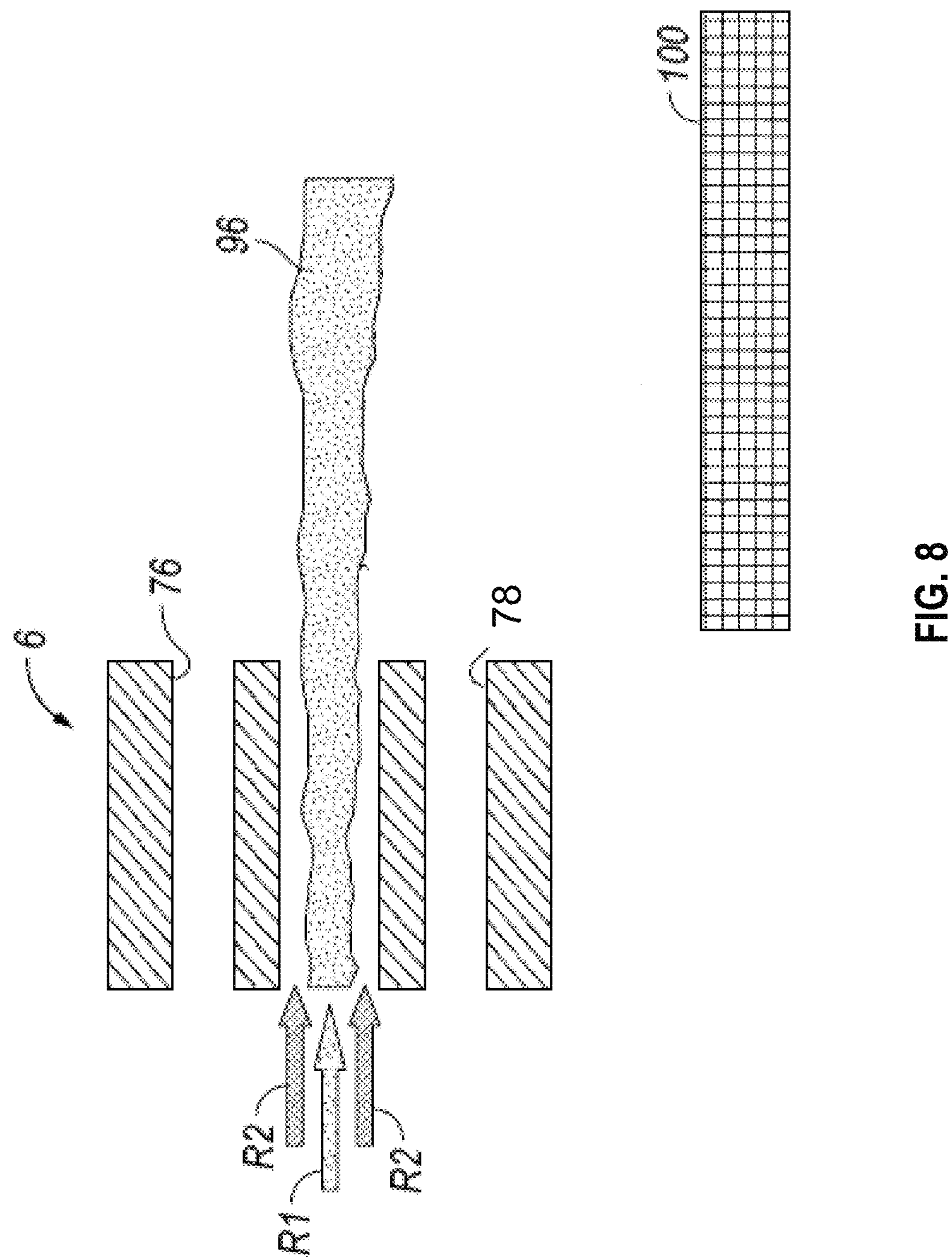
FIG. 8 is a side cross-sectional schematic view of an exemplary embodiment of a burner 6 in a third mode of operation that can be used in the first, second, third and fourth exemplary embodiments of the apparatus shown in FIGS. 1, 2, 3, and 4.

The burners 6 in different zones can be configured to operate in different modes to facilitate melting of the glass making material to provide a higher quality glass for output as the formed glass. FIGS. 6, 7, and 8 illustrate different modes of burner operation that can be utilized to provide different types of flames FL for facilitating a desired type of glass melting condition for different zones of the furnace 4 for forming glass from the glass making material. The glass making material 100 is shown in FIGS. 6, 7, and 8 schematically and can be glass when near the outlet of the furnace, can be solid material fed to the furnace when near the inlet of the furnace 4, and can be in an intermediate state when in an intermediate zone of the furnace between the inlet of the furnace 4 and an outlet of the furnace 4.

Each of the burners 6 can have an upper oxidant conduit 76 that can be positioned above an inner fuel conduit and an inner oxidant conduit of the burner 6. There can also be a lower oxidant conduit 78 positioned below the inner fuel conduit and inner oxidant conduit. The inner fuel and inner oxidant conduits can be positioned between the lower oxidant conduit 78 and upper oxidant conduit 76.

The burner 6 can be configured so that an inner flow R1 of fuel and an inner flow R2 of oxidant can be passed through inner oxidant and fuel conduits between the upper oxidant conduit 76 and lower oxidant conduit 78. The output of these flows of fuel and oxidant can form a flame 96. In a mode of operation shown in FIG. 8, the flame may project into the combustion chamber and avoid any type of lower or upper oxidant staging (no meaningful oxidant flow may be passed through the upper and lower oxidant conduits 76 and 78). Such a mode of operation may be desired in a situation where a relatively short, high velocity flame may be desired, such as when a burner 6 may be located near a vent or flue of the furnace in which there can be a large and highly turbulent cross flow or opposing flow of hot flue gas within the combustion chamber of the furnace 4 flowing toward the vent or flue.

The burner 6 can also be configured to operate in another mode in which foam control can be provided by the flame output from the burner 6. FIG. 7 illustrates an example of such a mode of operation. Foam 106 can be formed in the glass making material 100 as it is heated. The foam can be various elements that are passing out of the glass making material as it undergoes heating to form the glass. The flame 102 that is formed from the burner in this mode of operation can have aa luminous upper side 104 that can be provided via an upper oxidant flow 92 passed out of the upper oxidant conduit 76 of the burner. This increased presence of oxidant near the top of the flame can help facilitate the flame extending more upwardly and also help the heat generated from the lower side of the flame closer to the glass to provide a reducing atmosphere adjacent the glass making material 100 being heated to help break up the foam 106 and have the foam dissolve back into the material. This type of functionality can help improve the quality of the glass that is made by avoiding different elements from exiting the glass making material during the heating process. For example, the fuel-rich flame 102 can create a reducing atmosphere 108 below the flame just above the glass 100, which can help destabilize and break up foam on the glass surface so the constituents of the foam dissolve back into molten glass that is formed from the heating of the glass making material. In this mode of operation, there is not a meaningful flow of oxidant passed out of the lower oxidant conduit 78.

FIG. 6 illustrates yet another mode of operation for the burner 6, in which the flame 96 has a radiative underside 94 that is promoted via an oxidant flow 92 passed out of the lower oxidant conduit 78. The flame 96 that is output from the burner 6 in this mode of operation may have a soot-laden, optically-thick fuel-rich primary upper flame 96 above the radiative underside 94. The luminous underside 94 of the flame 96 that can be promoted via the oxidant flow 92 passed out of the lower oxidant conduit 78 can be effective at transmitting radiative heat 98 to the glass making material 100 in the furnace 4. The radiative heat 98 may be directed along an unobstructed radiative path directly to the upper surface of the glass making material 100 and the oxidant flow from the lower oxidant conduit 78 can help facilitate such heating.

Figure 9:
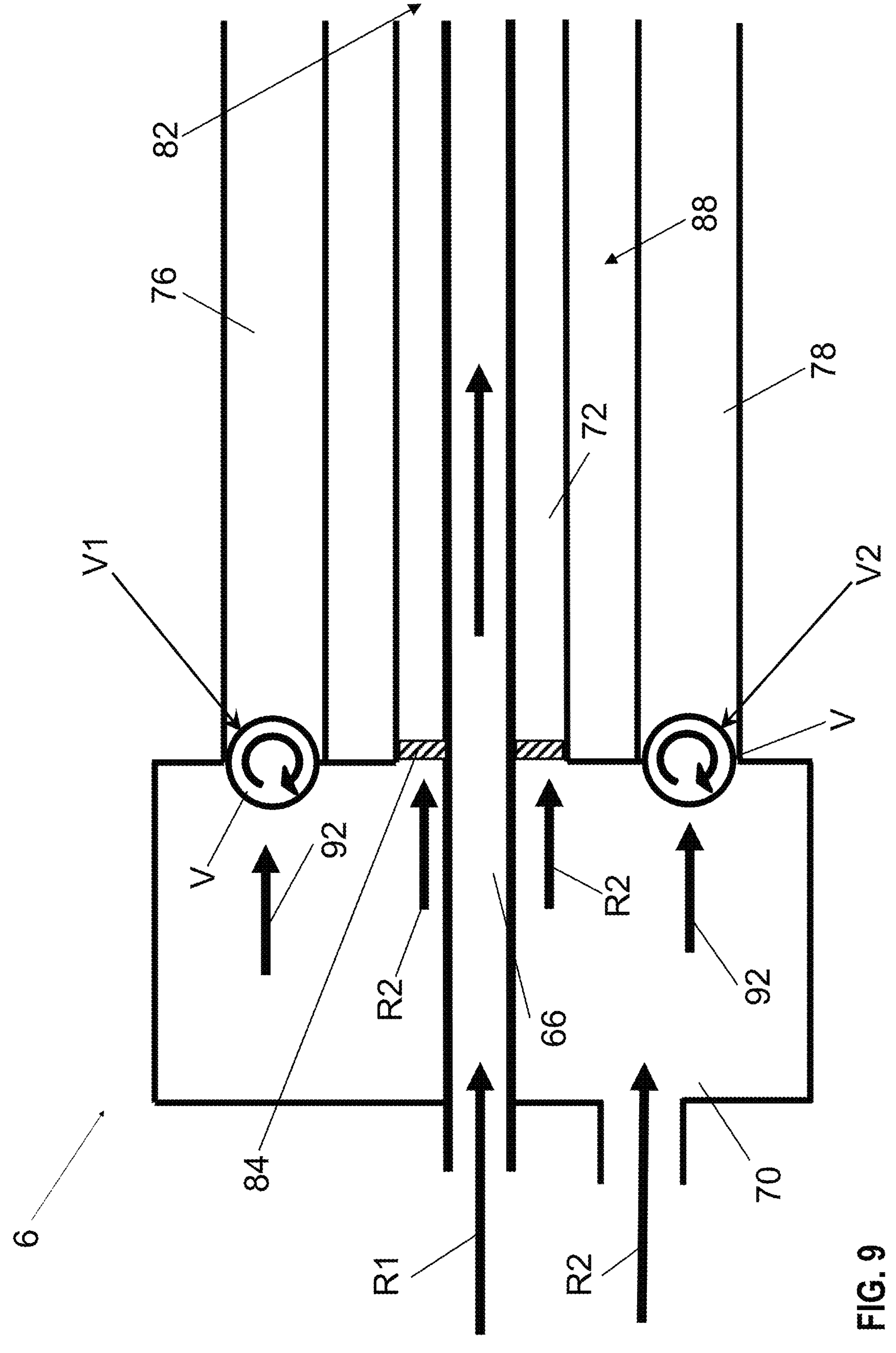
FIG. 9 is a side cross-sectional schematic view of an exemplary embodiment of the burner 6 that can be used in the first, second, third and fourth exemplary embodiments of the apparatus shown in FIGS. 1, 2, 3, and 4 and can be configured for utilization in the exemplary operational modes shown in FIGS. 6, 7 and 8.
Figure 10:
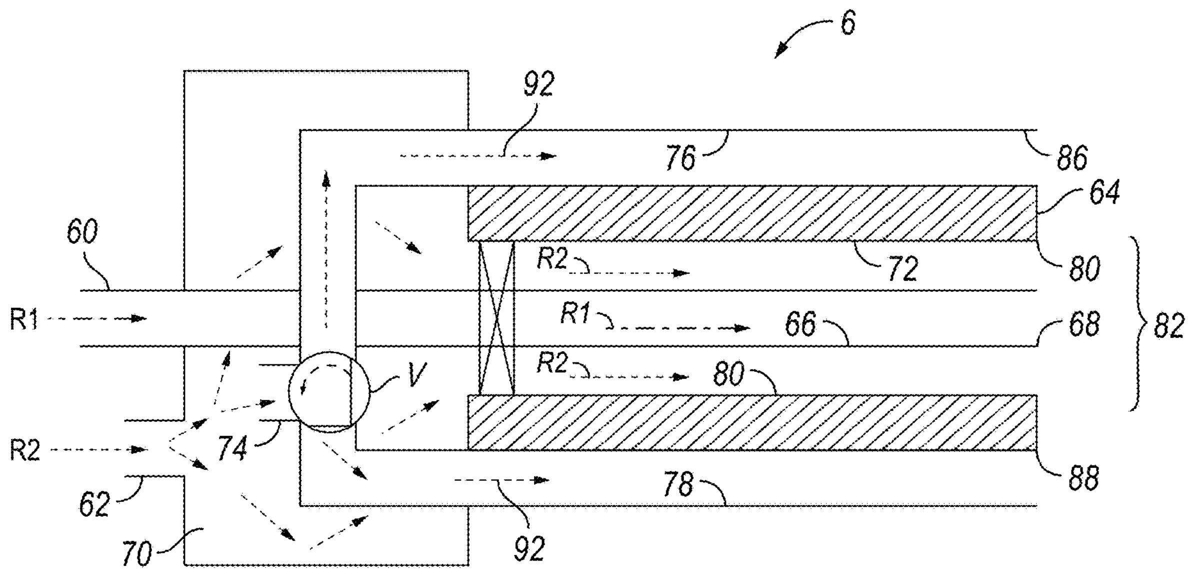
FIG. 10 is a side cross-sectional schematic view of another exemplary embodiment of the burner 6 that can be used in the first, second, third and fourth exemplary embodiments of the apparatus shown in FIGS. 1, 2, 3, and 4 and can be configured for utilization in the exemplary operational modes shown in FIGS. 6, 7 and 8.

FIGS. 9 and 10 illustrate different exemplary embodiments of burners 6 that can be utilized to provide these different modes of operation for generation of different flames FL that can provide different heating effects. Each of the burners 6 can include an innermost conduit 66 that is surrounded by another inner conduit 72. The source of fuel 20 can be operatively connected to the innermost conduit 66 so that fuel that is output from the source of fuel 20 can be fed to this conduit for being passed out of the outlet face of the burner via the innermost conduit 66. The inner conduit 72 can be an innermost oxidant conduit that can be operatively connected to an oxidant plenum 70 of the burner that can receive oxidant from the source of oxidant 16 for feeding through the inner oxidant conduit 72 as a flow R2 of oxidant. There can be a variable flow restrictor 84 or a fixed flow restrictor 84 positioned at the junction of the plenum 70 and the oxidant conduit 72 to facilitate a desired flow rate of oxidant to pass through the inner oxidant conduit 72 as flow R2 of oxidant. While a restrictor 84 can be utilized, it also may be omitted from the burner 6.

The plenum 70 can include an inlet 62 to receive the oxidant for feeding to one or more of the conduits of the burner (e.g. inner oxidant conduit 72, upper oxidant conduit 76, lower oxidant conduit 78, etc.). The burner 6 can have a combustion chamber output region 64 that can define an exit plane of the burner 6. The first reactant inlet 60 can feed fuel into a central innermost conduit 66 that can terminate in a central nozzle 68 at the combustion chamber output region 64 of the burner 6 so that a stream of fuel can flow out the central nozzle 68 and into a combustion chamber of the furnace 4 to form a flame FL via combustion of the fuel. The central nozzle 68 can be circular in shape or it may be in a non-circular shape. The central nozzle can be configured to facilitate the formation of a wide or flat-flame configuration with an aspect ratio (maximum dimension to minimum dimension) of at least two in some embodiments. In some embodiments, the burner 6 can also include a precombustion body that can be positioned to facilitate mixing of the fuel and the oxidant output from the inner oxidant conduit 72 and innermost fuel conduit 66 to facilitate ignition of the fuel to form the flame FL. Ignition can be facilitated via an igniter positioned in or adjacent the precombustion body or via radiant heat from the furnace 4.

The annular inner oxidant conduit 72 can terminate in an annular nozzle 80 at the combustion chamber output region 64 of the burner 6. Together, the central innermost conduit 66 and central nozzle 68, with annular inner conduit 72 and annular nozzle 80 can form a central burner element 82.

The amount of flow of oxidant apportioned between the inner oxidant conduit 72 and the staging inlet 74 is controlled by progressively opening or closing one or more oxidant valves V. A flow restrictor 84 can be positioned at the junction of the plenum 70 to also assist in control the distribution of an oxidant flow among the various burner oxidant conduits. The at least one valve can include a single valve V as shown in the exemplary embodiment of FIG. 10 or can include multiple valves V that can include a first valve V1 and a second valve V2 as shown in the exemplary embodiment of FIG. 9.

The plenum 70 can receive the oxidant via inlet 62 to feed the oxidant to one or more conduits for facilitating combustion of the fuel to form the flame and generation of the flame. For instance, the plenum 70 can distribute oxidant as a flow R2 that is passed through the annular inner conduit 72 that surrounds and is co-axial with the central innermost conduit 66.

In some embodiments, the plenum can include a staging inlet 74 that can be positioned to distribute oxidant to the upper oxidant conduit 76 and/or lower oxidant conduit 78. The staging inlet 74 can include a valve V that can be adjusted from a closed position in which no oxidant passes to the upper oxidant conduit 76 and lower oxidant conduit 78 or in which a minimal flow of oxidant is passed through these conduits (e.g. less than 5% of the oxidant fed to the plenum is passable to the upper oxidant conduit and less than 5% of the oxidant fed to the plenum is passed to the lower oxidant conduit when the valve V is in a closed position, etc.). The valve V can also be adjusted to other positions in which a larger flow of oxidant can be fed to the lower oxidant conduit 78 or the upper oxidant conduit 76 to facilitate different modes of operation of the burner 6 as noted above.

The upper oxidant conduit 76 can be parallel to and spaced apart from one side of the central burner element 82 and can terminate in a first staging nozzle 86 at a combustion chamber output region 64 of the burner 6. The upper oxidant conduit 78 can be parallel to and spaced apart from an opposite side of the central burner element 82 and can terminate in a second staging nozzle 88 at the combustion chamber output region 64 of the burner 6. In some embodiments, a three-way valve V can be positioned downstream of the staging inlet 74 or at the staging inlet 74 so that the valve V can be adjusted to apportion a staging flow of the oxidant between the upper oxidant conduit 76 and the lower oxidant conduit 78. The valve V can be positioned so that almost all of the oxidant flow to be directed to the upper and/or lower oxidant conduits 76, 78 is directed to the upper oxidant conduit 76 (e.g. the burner operates in a mode of operation as shown in FIG. 7), or so that almost all of oxidant flow to be directed to the upper and/or lower oxidant conduits 76, 78 is directed to the lower oxidant conduit 78 (e.g. the burner operates in a mode of operation as shown in FIG. 6), or so that the oxidant flow is distributed with a non-zero pre-selected minimum portion being directed to the upper oxidant conduit 76 and a non-zero pre-selected minimum portion being directed to the lower oxidant conduit 78 (e.g. the burner operates in a mode of operation as shown in FIG. 8).

Embodiments of the burner can utilize multiple valves instead of a single valve V. For example, the staging inlet 74 can include an inlet for passing oxidant into the upper oxidant conduit 76 and another inlet for passing oxidant into the lower oxidant conduit 78. The inlet for the upper oxidant conduit 76 can have a first valve V1 and the inlet for the lower oxidant conduit 78 can have a second valve V2. Each valve V can be adjustable between opened and closed positions. In the closed position, each valve may prevent oxidant from flowing into their respective oxidant conduit to which the valve is connected or may only permit a pre-selected minimum flow of oxidant to pass through that valve and into the oxidant conduit to which the valve is connected. Each valve can also be adjusted to different opened positions to facilitate operation in the different modes of burner operation as shown in FIGS. 6, 7, and 8.

For example, the first valve V for the upper oxidant conduit 76 and the second valve V for the lower oxidant conduit 78 can be in their closed positions to facilitate burner operation in the mode of operation shown in FIG. 8. The first valve V1 for the upper oxidant conduit 76 can be in an opened position and the second valve V2 for the lower oxidant conduit 78 can be in a closed position to facilitate burner operation in the mode of operation shown in FIG. 7. The first valve V1 for the upper oxidant conduit 76 can be in a closed position and the second valve V2 for the lower oxidant conduit 78 can be in an open position to facilitate burner operation in the mode of operation shown in FIG. 6.

When the burner 6 operates in a mode of operation in which a minimal purge flow of oxidant is passed through the upper oxidant conduit 76 and a significant flow of oxidant is passed through the lower oxidant conduit 78 while oxidant is also passed through the inner oxidant conduit 72 so that the burner operates in a mode as shown in FIG. 6, the oxidant passed through the upper oxidant conduit 76 can be between 0% and 20%, between 0% and 10% or between 0% and 5% of the oxidant fed to the plenum, the oxidant passed through the lower oxidant conduit 78 can be between 40% and 90% of the oxidant fed to the plenum, and the inner oxidant conduit 72 can receive the remaining portion of the oxidant.

When the burner operated in a mode of operation in which a minimal purge flow of oxidant is passed through the lower oxidant conduit 78 and a significant flow of oxidant is passed through the upper oxidant conduit 76 while oxidant is also passed through the inner oxidant conduit 72 so that the burner operates in a mode as shown in FIG. 7, the oxidant passed through the lower oxidant conduit 78 can be between 0% and 20%, between 0% and 10% or between 0% and 5% of the oxidant fed to the plenum, the oxidant passed through the upper oxidant conduit 76 can be between 40% and 90% of the oxidant fed to the plenum, and the inner oxidant conduit 72 can receive the remaining portion of the oxidant.

When the burner 6 operates in a mode of operation in which a minimal purge flow of oxidant is passed through the upper oxidant conduit 76 and a minimal purge flow of oxidant is also passed through lower oxidant conduit 78 while oxidant is also passed through the inner oxidant conduit 72 so that the burner operates in a mode as shown in FIG. 8, the oxidant passed through the lower oxidant conduit 78 can be between 0% and 20% between 0% and 10% or between 0% and 5% of the oxidant fed to the plenum, the oxidant passed through the upper oxidant conduit 76 can be between 0% and 20% or between 0% and 10% or between 0% and 5% of the oxidant fed to the plenum, and the inner oxidant conduit 72 can receive the remaining portion of the oxidant (e.g. between 100% and 60% of the oxidant fed to the plenum 70).

The burners 6 can also be configured to facilitate a split staging mode of operation in which there is oxidant flows of significant flow rates passed through the upper oxidant conduit 76 and also the lower oxidant conduit 78. In such a configuration, the valve(s) V for controlling the feed of oxidant received by the plenum 70 via inlet 62 can be set so that a significant flow of oxidant is passed through the upper oxidant conduit 76 and the lower oxidant conduit 78. Such a staging flow of oxidant can facilitate formation of a flame FL with oxidant output from the lower oxidant conduit 78 and upper oxidant conduit 76 passing along the underside of the flame and the upper side of the flame to help facilitate flame propagation in the combustion chamber and provide a desired flame length for the flame FL. In some embodiments, this split mode of operation can be provided such that the oxidant fed to the plenum 70 is split for passing through the inner conduit 72, upper oxidant conduit 76, and lower oxidant conduit 78 so that 0%-40% of the oxidant fed to the plenum 70 is passed through the inner conduit 72, 30%-60% of the oxidant fed to the plenum 70 is passed through the upper oxidant conduit 76, and 30%-60% of the oxidant fed to the plenum 70 is passed through the lower oxidant conduit 78.

The split staging mode of operation for the burners 6 can be advantageous when the combination of high flame momentum and high flame luminosity is desired. This can often be the case when burners 6 are placed near the exhaust flues in the melting region of the furnace 4, for example. Burner flames in this region can be adversely affected by proximate flow of combustion gases exiting the furnace through the flues. A high momentum flame that can be generated via use of the split staging mode can help to maintain flame stability in such an environment. However, it can be difficult to achieve a high momentum flame while simultaneously producing the high flame luminosity that can be desired for efficient glass melting. For example, high flame momentum often may not provide sufficient residence time for the processes of soot inception, growth, and agglomeration that can be desired for achieving a highly luminous flame. Embodiments of the burner 6, when operated in the split staging mode, can overcome such issues by surrounding the generated flame FL with oxygen on the upper and lower sides of the flame FL as it discharges into the furnace, which can cause the fuel jet output from the innermost conduit 66 to combust and heat up much more rapidly as compared to when oxidant staging occurs on one side only. Further, the staged oxygen on opposite sides of the flame can help constrain the flame's vertical expansion within the furnace. In so doing, the more rapid fuel jet combustion and heating can result in enhanced forward axial acceleration to provide a high flame (axial) momentum. The flame luminosity in this split staging mode can be provided via operating with as low a primary oxygen flow passing through the inner oxidant conduit 72 as can be tolerated according to site-specific operating constraints. It has unexpectedly been found that the combination of simultaneous over- and under-oxygen staging plus a relatively low proportion of primary oxidant passed through the inner oxidant conduit 72 to fuel flow rate passed through the innermost central conduit 66 can advantageously provide sufficient residence time for soot inception, growth, and agglomeration, while also achieving high flame momentum.

In some embodiments, the full amount of fuel supplied to the oxy-fuel burner 6 can be passed through the innermost central conduit 66 for being output into the furnace via the central nozzle 68 while a very small proportion of oxidant supplied to the burner 6 can be passed through the inner oxidant conduit 72 of the annular nozzle 80. In some configurations, less than 20% or less than 10% or less than 5% of the oxidant can be passed through the inner oxidant conduit 72, with the balance of the oxygen going to one or both of the upper and lower oxidant conduits 76 and 78 for operation in an upper oxidant conduit staging mode (e.g. mode of operation shown in FIG. 7), operation in the above discussed split staging mode, or operation in a lower oxidant conduit staging mode (e.g. mode of operation shown in FIG. 6). This would equate, respectively to preferred staging rations of at least 80%, at least 90%, or at least 95% of the oxidant fed to the plenum 70 of the burner 6.

In some embodiments when the burner 6 is operated with under-flame staging (e.g. a significant flow of oxidant passed through the lower oxidant conduit 78 as discussed above and shown in FIG. 6), at least 50% of the oxidant can be flowed through the lower oxidant conduit 78 while the balance is flowed through the inner oxidant conduit 72. In some embodiments, at least 70% or at least 90% of the oxidant can be passed through the lower oxidant conduit 78 while the balance is flowed through the inner oxidant conduit 72 (and in some embodiments with an optional minimal purge amount being passed through the upper oxidant conduit 76).

When the burner 6 is operated with an over-flame staging (e.g. a foam reducing mode similar to the mode of operation shown in FIG. 7 in which a reducing atmosphere is created above the glass making material 100), at least 70% of the oxidant fed to the plenum 70 of the burner can be passed through the upper oxidant conduit 76 with the balance being flowed through the inner oxidant conduit 72 (and in some embodiments with an optional minimal purge amount being passed through the lower oxidant conduit 78). In some embodiments, at least 80% or at least 90% of the oxidant fed to the plenum 70 can be passed through the upper oxidant conduit 76 when the burner is in the foam reducing mode (e.g. mode of operation similar to FIG. 7).

Operation of the furnace to control heating provided via flames FL generated by the burners 6 can also be adapted to account for oxidant temperature conditions. For example, the burners 6 can be adjusted in operation for cold oxidant conditions or hot (e.g. heated) oxidant conditions that may exist. The adjustment from a cold oxidant operation to a hot oxidant operation condition (e.g. a condition in which the oxidant fed to the burners 6 is at or above a pre-selected hot oxidant temperature threshold), which can involve both flue gas and oxidant passing through oxidant heater 8, can occur at different times to account for different operational cycles; e.g. furnace 4 startup and heat up after, or following equipment maintenance or repair. Conversely, the adjustment from hot oxidant operation to cold oxidant operation (e.g. a condition in which the oxidant fed to the burners 6 of the furnace is below a per-selected hot oxidant temperature threshold), the latter of which involves substantially bypassing one or both of the oxidant and flue gas around the oxidant preheater 8, can occur prior to initiating equipment maintenance or repair. Temperature sensors and other sensors can provide data to one or more controllers for adjusting the operational modes of the burners 6 in accordance with a pre-selected process control scheme. Operator input can be utilized as well for actuating such adjustments in operation.

In some embodiments, the pre-selected hot oxidant temperature threshold can be 1000° F., or 540° C. Other embodiments may utilize a different temperature threshold for the pre-selected hot oxidant temperature threshold (e.g. 425° C., 450° C., 475° C., 500° C., 520° C., 538° C., etc.).

As may best be appreciated from FIGS. 5-8, during cold oxidant operations in which the oxidant is below a pre-selected hot oxidant threshold temperature threshold, the burners 6 in different zones can be set to operate in different modes of operation to facilitate accelerated glass melting, high fuel efficiency and removal of glass defects; the glass defect removal being providable through the break up the foam in a downstream zone of furnace 4. For example, a first zone Z1 of the burners 6 can be operated in a mode similar to the mode shown in FIG. 8 in which there is no staging oxidant flows passing through the upper and lower oxidant conduits 76, 78 (e.g. no oxidant flow or only a minimal purge flow as noted above) and the oxidant is entirely or almost entirely passed through the inner conduit 72 to be in proximity to the fuel to facilitate combustion in the cold furnace. A downstream final zone can have burners 6 that operate in a different mode for foam control. This mode of operation can be similar to the mode shown in FIG. 7 in which there is a significant flow of oxidant passed through the upper oxidant conduit 76 and no oxidant flow or only a minimal purge flow of oxidant passed through the lower oxidant conduit 78 with a balance of the oxidant being passed through the inner oxidant conduit 72 to be in proximity to the fuel output from the central inner conduit 66 for formation of a desired flame FL for foam control as noted above. The furnace may have other zones between the upstream first zone and downstream final zone. For example, a second zone Z2 can be an intermediate zone and the burners 6 in this zone can operate in the same mode of operation as the burners in the first zone Z1. As another example, a third zone Z3 can be an intermediate zone that is between the second zone Z2 and the fifth zone Z5 and the burners 6 in this third zone Z3 can operate in the same mode of operation as the burners in the first zone Z1 and the burners of the second zone Z2, which can be located between the first zone Z1 and the third zone Z3. There can also be a fourth zone Z4 that has burners 6 that can operate in a mode similar to the mode of the burners of the fifth zone Z5. The intermediate fourth zone Z4 can be located between the third zone Z3 and the fifth zone Z5 and be operational in a foam control mode similar to the mode of operation shown in FIG. 7.

In a hot oxidant operational condition in which the oxidant is at or above the pre-selected hot oxidant temperature threshold, the burners 6 can be adjusted in operation to provide different flames to account for the heated condition of the oxidant. Such an adjustment can occur based on detected temperature of the oxidant being fed to the burners 6 or can also be inferred via detected oxidant pressure at or upstream of the burner inlet.

In some embodiments, changes in the oxidant temperature fed to the burners 6 can account for an adjustment in burner operational modes so that the burners of the furnace in the upstream zone(s) operate in a different mode. The downstream zone(s) (e.g. the fifth zone Z5 and optionally also the fourth zone Z4) can stay in an operational mode for foam control similar to the mode of operation shown in FIG. 4 and discussed above. The upstream zones (e.g. first zone Z1 and optional intermediate second zone Z2 and third zone Z3, etc.) can have a different operational mode. For example, in some embodiments the burners of the first zone Z1 can operate in a split staging mode of operation as discussed above in which significant flows of oxidant are passed through the upper and lower oxidant conduits 76, 78. The burners 6 of the second zone Z2 and/or third zone Z3 can also operate in this mode of operation or may operate in a mode of operation similar to the mode of operation shown in FIG. 6 in which a significant oxidant flow is passed through the lower oxidant conduit 78 while no oxidant flow or only a minimal purge oxidant flow is passed through the upper oxidant conduit 76.

As another example, in some embodiments the burners of the first zone Z1, second zone Z2, and the third zone Z3 can each operate in a mode of operation similar to the mode of operation shown in FIG. 6 in which a significant oxidant flow is passed through the lower oxidant conduit 78 while no oxidant flow or only a minimal purge oxidant flow is passed through the upper oxidant conduit 76 while the furnace is in a hot oxidant condition.

As yet another example, the burners of the first zone Z1 and second zone Z2 can operate in the above discussed split staging mode of operation in which significant flows of oxidant are passed through the upper and lower oxidant conduits 76, 78. The burners of the third zone Z3 can operate in a mode of operation similar to the mode of operation shown in FIG. 6 in which a significant oxidant flow is passed through the lower oxidant conduit 78 while no oxidant flow or only a minimal purge oxidant flow is passed through the upper oxidant conduit 76 while the furnace is in a hot oxidant condition.

The hot oxidant operational condition of the oxidant can account for an adjustment in burner operational modes so that the burners of the furnace in the downstream zone(s) operate in a different mode as well. For example, the one or more burners 6 of the downstream zone(s) (e.g. the fifth zone Z5 and/or the fourth zone Z4) can be adjusted from an operational mode for foam control similar to the mode of operation shown in FIG. 4 and discussed above to a split staging mode of operation as discussed above in which significant flows of oxidant are passed through the upper and lower oxidant conduits 76, 78. In some embodiments, the burners of the fourth zone Z4 can be adjusted to such a split staging mode while burners of the fifth zone Z5 may be kept in a foam control mode, the burners of the fourth zone Z4 can be kept in foam control mode while burners of the fifth zone Z5 are adjusted to the split staging mode, or burners of both the fourth and fifth zones Z4 and Z5 can be adjusted to the split staging mode.

When the furnace is sufficiently hot, the flue gas can have a suitable output temperature for use in preheating of the oxidant, fuel, and/or a portion of the glass making material via fluid heater 24. After the flue gas temperature is at a sufficiently hot temperature, the flow of oxidant, fuel, and the heating medium for being passed through the fluid heater 24 can be adjusted to account for the flue gas temperature and desired levels of preheating to provide enhanced efficiencies via recovery of heat from the flue gas as noted above as well.

As described above, each of the burners 6 of the furnace 4 can be operated in a variety of different modes (e.g., split mode, melt mode, foam control mode, etc.) depending on the needs of the operator. The combustion profile of the burner(s) 6 (e.g. mode of operation of the burner(s) 6) can be adjusted based on a temperature of the oxidant and/or fuel being fed to the burner(s) 6.

When the temperature of the oxidant and/or fuel fed to the burner 6 is at or slightly above ambient conditions (e.g., 1° C.-50° C. or 1° C.-100° C. above ambient temperature), the density of the oxidant is relatively high as compared to its density when the glassmaking process is operating at "normal" operating temperatures and no bypass is used around the oxidant preheater 8. Therefore, the volumetric flow rate (e.g. velocity) of the oxidant at or slightly above (e.g., 1° C.-50° C. or 1° C.-100° C.) ambient temperature is relatively low. Given the relatively low velocity, at least 60% of the oxidant fed to the burner 6 can be directed to flow through the central nozzle 68 of the burner 6 (e.g. via inner oxidant conduit 72) to provide an optimal mixing of oxygen and fuel for positively impacting combustion efficiency. Diverting the majority of the oxygen entering the burner 6 to the central nozzle 68 can be accomplished through the closure or partial closure of the one or more valves V of each burner 6 as noted above.

In contrast, when a heated oxidant stream enters the oxy-fuel burner 6 (e.g. via oxidant preheater 8, the velocity of the oxidant can be considerably higher (e.g., 3× or 2.5× higher, respectively) at a given flow rate when compared to the velocity of the oxidant when it is at or slightly above ambient temperature. Such a condition, if not accompanied with changes to oxidant staging relative to those prescribed for cold oxidant operation as outlined previously, can result in the reduced oxidant density and increased volumetric flow rate that can substantially and negatively affect fuel and oxidant mixing at the burner outlet, and hence combustion properties of the flame generated via the burner 6. The burner 6 configuration and processing utilizing the burners 6 described herein that can provide for the number and arrangement of oxidant staging conduits is such that a second optimal fuel and oxidant mixing condition can be obtained in the hot oxidant mode through the burner valve manipulations discussed above.

Adjustment in the operation of the burners 6 can be performed to adjust the oxidant operational mode of the furnace from a cold oxidant operational mode to a hot oxidant operational mode and vice versa in different cycles of operation. The adjustment in feeding of oxidant to oxidant preheater 8 via the oxidant preheater bypass conduit can facilitate such an adjustment in operational condition. The fuel can also be routed to bypass the fuel preheater 10 as may be desired to facilitate such operation as well. In conjunction with a change in oxidant temperature, the velocity profile of the oxidant can change significantly. Also, the flue gas can be routed to bypass the oxidant preheater 8 and/or the fuel preheater 10 to facilitate less or more preheating of the oxidant and/or fuel to facilitate such operation. Flue gas bypassing can occur in combination with oxidant bypassing of the oxidant preheater 8 and/or fuel bypassing of the fuel preheater 10 or may alternatively occur instead of fuel bypassing of the fuel preheater 10 and/or oxidant bypassing of the oxidant preheater 8.

In an oxidant cold mode of operation, the oxidant can be much denser due to its lower temperature and a lower velocity of oxidant output from burners can occur due to the higher mass passing through those conduits. However, in an oxidant hot mode of operation, the density of oxidant is much lower, and the velocity of oxidant for that same mass may need to be substantially higher. The utilization of staging via upper and/or lower oxidant conduits 76, 78 in response to the oxidant being at or above a pre-selected hot oxidant temperature threshold can provide additional volume for accommodating the additional oxidant needed to provide the same mass flow rate of oxidant to the combustion chamber to account for the change in density of the oxidant. The flexibility in adjusting the operations of the burners to account for oxidant temperature can allow for a more precisely controlled flame that accounts for the composite flame momentum by diverting some oxidant to other oxidant conduits to better manage flame length in the combustion chamber and to provide a more consistent flame length of flame profile as the operational mode of the furnace changes. The accounting for composite flame momentum can account for the changes in oxidant density from use of cooler oxidant to hotter oxidant and vice versa in combination with changes of staging of oxidant so flame length and/or flame profile is better controlled during operational mode changes of the furnace 4.

In many embodiments, the oxidant supply pressure for the furnace 4 can be between 4 psig and 15 psig (or 28.2 kPa(g) to 103.4 kPa(g)), the operator can desire to minimize and/or avoid oxidant pressure-drop from the source of oxidant to the furnace 4. In some embodiments, the oxidant supply can be provided via a low pressure of no more than 6 psig (e.g. less than 41.4 kPa and greater than 0 kPa). Operating the burner 6 with a larger oxidant flow area is one way to prevent excess pressure-drop in the burner 6, which can be accomplished by directing at least 50% of the oxidant flowing through the burner 6 through the upper and lower oxidant conduits 76, 78. In other words, no more than 50% of the oxygen can be directed through the central nozzle 68 (e.g. inner oxidant conduit 72). This method of operating can (i) lower the oxidant pressure drop; and (ii) cool the central nozzle 68. This approach can also avoid (a) bringing convective heating to the central nozzle 68; and (b) accelerating the combustion reactions near the central nozzle 68 that may further exacerbate a potential nozzle overheating issue given the extremely high temperature of the heated oxidant that can be utilized via the hot furnace preheating the oxidant and fuel via oxidant preheater 8 and fuel preheater 10.

And we have surprisingly found that embodiments can utilize a low pressure of no more than 6 psig even though the oxidant can be routed from a source of oxidant to the burners via an oxidant preheater 8 and/or bypass conduit. In some embodiments, an oxidant compressor is not needed to help facilitate the flow of oxidant due to the low pressure that may be used to drive the flow of oxidant to the burners 6. In such a case, which is typically associated with oxygen produced via air separation in an adsorption system, the oxidant pressure is produced solely by an inlet air blower.

In some modes of operating the system 2 (and as discussed above), one or both of the oxidant preheater bypass conduit and fuel preheater bypass conduit can be utilized to help incrementally lower the temperatures of the heated oxidant exiting the oxidant preheater 8 and the heated fuel exiting the fuel preheater 10. Utilization of these bypass mechanisms can be done either manually or via automated process control, can be in response to the temperature of the heated oxidant and/or temperature of the heated fuel, detected pressure drop in the burner 6 via at least one pressure sensor positioned to detect such a pressure drop, and/or a detection of the temperature of the central nozzle 68 of the burner 6 via a temperature sensor positioned to detect such a temperature.

Figure 13:
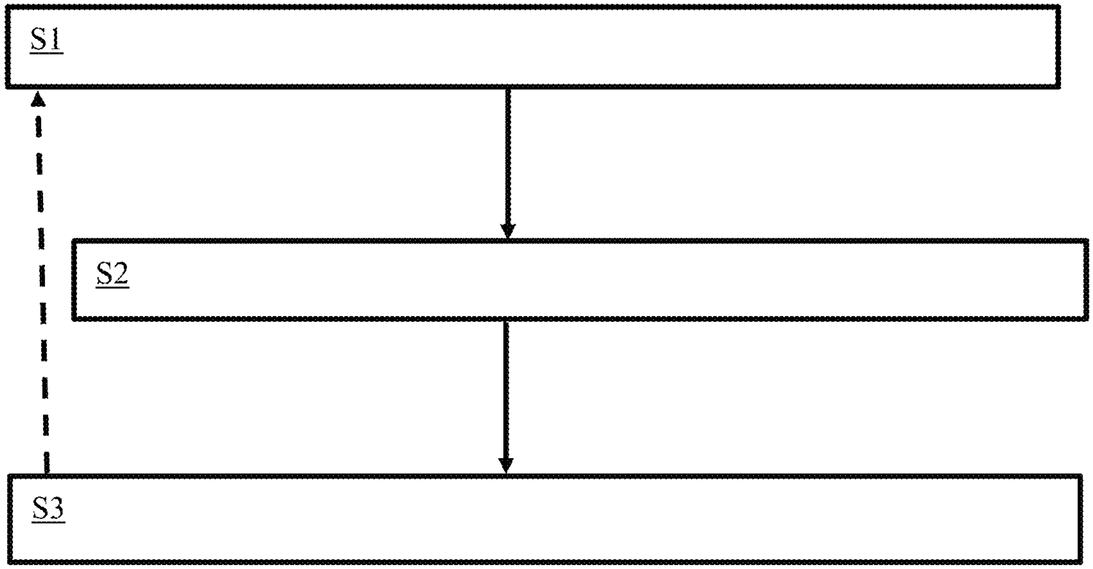
FIG. 13 is a flow chart illustrating an exemplary embodiment of a process for making glass.

FIG. 13 illustrates an exemplary process that can be utilized in embodiments of the system 2. For example, in a first step S1, the furnace 4 can be cold and receive unheated fuel and oxidant for combustion. In this initial first step, the burners of at least one upstream zone (e.g. first zone Z1, second zone Z2, and/or third zone Z3) can be operated in a mode of operation in which an inner flow R1 of fuel and an inner flow R2 of oxidant can be passed through inner oxidant and fuel conduits of the burners in the one or more upstream zones between the upper oxidant conduit 76 and lower oxidant conduit 78 of the burner(s) 6. The output of these flows of fuel and oxidant can form a flame 96 that can project into the combustion chamber and avoid any type of lower or upper oxidant staging (no meaningful oxidant flow may be passed through the upper and lower oxidant conduits 76 and 78).

Also, the one or more burners 6 in one or more downstream zones (e.g. fourth zone Z4 and/or fifth zone Z5) can be operated in a foam control mode of operation in which The flame 102 that is formed from the burner(s) 6 in this mode of operation can have a reducing lower side 106 that can be provided via an upper oxidant flow 92 passed out of the upper oxidant conduit 76 of the burner and minimal oxidant flow passed out of the lower oxidant conduit 78. This diverting of oxidant away from the bottom of the flame can create a reducing atmosphere adjacent the glass making material 100 being heated to help break up the foam 106 and have the foam dissolve back into the molten glass. This type of functionality can help improve the quality of the glass that is made by avoiding different elements from exiting the glass making material during the heating process.

After the oxidant is detected as being sufficiently hot (e.g. temperature of the oxidant is detected as being at or above a pre-selected hot oxidant threshold value, etc.), the burner operations can be adjusted in a second step S2. In such a second step, at least the upstream burner(s) of the one or more upstream zones (e.g. first zone Z1, second zone Z2 and/or third zone Z3) can be adjusted to a split staging mode of operation as discussed above or a melt mode of operation in which the flame has a radiative underside 94 that is promoted via an oxidant flow 92 passed out of the lower oxidant conduit 78 (e.g. as discussed above with reference to FIG. 6). The flame 96 that is output from the burner(s) 6 in this mode of operation may have a soot-laden, optically-thick fuel-rich primary upper flame 96 above the radiative underside 94. The luminous underside 94 of the flame 96 that can be promoted via the oxidant flow 92 passed out of the lower oxidant conduit 78 can be effective at transmitting radiative heat 98 to the glass making material 100 in the furnace 4. Due to the optically-thick upper flame 96, the radiative heat 98 may be preferentially directed along an unobstructed radiative path directly to the upper surface of the glass making material 100 and the oxidant flow from the lower oxidant conduit 78 can help facilitate such heating.

In some situations, one or more burners in at least one downstream zone (e.g. fourth zone Z4 and/or fifth zone Z5) can also be adjusted in operation in response to the oxidant being detected as being at or above a pre-selected hot oxidant threshold value in this second step S2. Such an adjustment can adjust at least some of these burners from a foam control mode to a split staging mode as discussed above, for example.

In a third step S3, the oxidant and/or fuel can be preheated via oxidant preheater 8 and/or fuel preheater 10. This preheating may also occur during the first step S1 and the second step S3. The preheating of the third step S3 can include adjustments to the preheating of the oxidant and/or fuel. For example, the preheating of the oxidant and/or fuel can be adjustably controlled to account for the temperature of the furnace, desired temperature of the oxidant, and/or other operational parameters. For example, an entirety of the oxidant can be preheated via oxidant preheater and/or an entirety of the fuel can be preheated via the fuel preheater 10. The preheating can also be adjusted via oxidant preheater bypass conduit and/or fuel preheater bypass conduit to adjust the extent to which the fuel and/or oxidant may be preheated.

For example, the third step S3 can include adjustment of the preheaters so that there is no more preheating of oxidant and fuel to transition the furnace 4 back into a cold mode operation (e.g. to reduce the temperature of the oxidant being fed to the burners to be below the pre-selected hot oxidant temperature threshold). This type of adjustment in processing can be performed gradually or quickly. In such processing, the oxidant preheater bypass conduit and the fuel preheater bypass conduit can be utilized so that all the fuel and oxidant bypass the oxidant preheater 8 and fuel preheater 10 to return the furnace 4 to a cold mode of operation. Such processing can also be performed in conjunction with adjusting the burners 6 to adjust their operational modes (e.g. adjusting of the burners 6 so that the first step S1 is performed and the burners 6 operate as indicated above in conjunction with the first step S1 (as indicated via broken line in FIG. 13). As noted above, the adjustment in burner operations can be performed to account for the composite flame momentum that can be affected via the changed temperature and density of the oxidant being fed to the burner to better control flame length of other flame profiles of the flames generated by the burners 6.

The glass making material feed can also be preheated in the second step S2 or the third step S3 via the fluid heater 24 and the glass making feed material pre-heating device 26 as noted above. This preheating can occur in response to the furnace being determined to be at a sufficiently hot temperature or can be provided at another suitable operational time. The heating medium utilized in the glass making feed material pre-heating device 26 can be heated via the flue gas passed through the fluid heater 24 for being fed to the glass making feed material pre-heating device 26 for heating the glass making material fed to the glass making feed material pre-heating device 26. Heated air 11 can also be fed to the glass making feed material pre-heating device 26 to facilitate preheating of the glass making material and help avoid backward migration of the glass making material as noted above.

The bypassing of flue gas can be provided to bypass the fluid heater 24 in situations where the flue gas temperature may be at, above, or approaching a maximum operating temperature of the heating medium that is utilized for the pre-heating of the glass making material. The bypassing can be provided by a preheater bypass conduit or another fluid heater bypass conduit positioned to provide for the flue gas to bypass the fluid heater 24 is it is passed toward the stack 12.

The preheating and fluid heater heating of the heating medium used for the glass making feed material pre-heating device 26 can be adjusted during the third step S3 to account for different detected operational conditions (e.g. temperature, pressure, flow rate, etc.) in accordance with a predefined process control scheme.

In the event the furnace operation is substantially interrupted for a period of time such that the furnace must be returned to its cold condition, the process can return to the first step S1 for restarting of the furnace 4.

Embodiments of the process can be provided for making glass of a higher quality and/or more consistent quality in a more energy efficient manner. Embodiments can also provide enhanced operational flexibility to provide such improvements.

It should be appreciated that different embodiments can utilize other elements or features. For example, embodiments can utilize an array of different types of conduit arrangements, different sized structures, different sources of fuel, or different sources of glass making material. The oxidant can be oxygen gas, air, oxygen enriched air, or other suitable oxidant. The fuel can be natural gas, oil, or other suitable fuel. The heating medium utilized for preheating of glass making material to be fed to the furnace can be any suitable heating medium as well. Different embodiments may utilize different types of automated process control schemes for controlling operation of the furnace 4 and/or burners 6 and/or bypassing of the oxidant preheater 8 and/or bypassing of the fuel preheater 10. Flue gas bypassing of one or more of these heat exchangers between the furnace 4 and the stack 12 can also be adjusted to account for a pre-selected process control scheme via heat exchanger bypass valve 39 or other suitable bypass conduit arrangement.

The articles "a" and "an" as used herein mean one or more when applied to any feature in embodiments of the present disclosure described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used.

As used herein, "plurality" means two or more.

As used herein, "first," "second," "third," etc. are used to distinguish from among a plurality of steps and/or features, and are not indicative of the total number, or relative position in time and/or space unless expressly stated as such.

As used herein, "includes" and like terms means "including without limitation."

As used herein, the phrase "and/or" placed between a first entity and a second entity includes any of the meanings of (1) only the first entity, (2) only the second entity, and (3) the first entity and the second entity. The term "and/or" placed between the last two entities of a list of 3 or more entities means at least one of the entities in the list including any specific combination of entities in this list. For example, "A, B and/or C" has the same meaning as "A and/or B and/or C" and comprises the following combinations of A, B and C: (1) only A, (2) only B, (3) only C, (4) A and B and not C, (5) A and C and not B, (6) B and C and not A, and (7) A and B and C.

When referring to any numerical range of values, such ranges are understood to include each and every number and/or fraction between the stated range minimum and maximum. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

While specific embodiments of the disclosure has been described in detail, it will be appreciated by those skilled in the art that various modifications and alternatives to those details could be developed in light of the overall teachings of the disclosure. Accordingly, the particular arrangements disclosed herein are meant to be illustrative only and not limiting as to the scope of the disclosure which is to be given the full breadth of the claims and any and all equivalents thereof.

What is claimed is:

1. A method for producing glass comprising:

feeding fuel and oxidant to burners of a furnace to combust the fuel to heat glass making material for making glass such that:

(i) at least one burner in at least one upstream zone of the furnace operates in a mode of operation in which an inner flow of fuel and an inner flow of oxidant are output into the furnace between an upper oxidant conduit and a lower oxidant conduit such that a flame is formed to project into a combustion chamber of the furnace without upper oxidant staging via the upper oxidant conduit and without lower oxidant staging via the lower oxidant conduit while the oxidant is below a pre-selected hot oxidant temperature threshold; and (ii) at least one burner in at least one downstream zone of the furnace that is downstream of the at least one upstream zone of the furnace is operated in a foam control mode of operation in which an upper oxidant flow is passed out of an upper oxidant conduit of the burner along with an inner flow of fuel and an inner flow of oxidant that are output into the furnace so that combustion of the fuel from the at least one burner in the at least one downstream zone of the furnace forms a flame that extends upwardly to provide a reducing atmosphere adjacent the glass making material in the at least one downstream zone of furnace to dissolve foam back into the glass making material while the oxidant is below the pre-selected hot oxidant temperature threshold.

2. The method of claim 1, comprising:

passing flue gas output from the furnace through an oxidant preheater positioned downstream of the furnace between a stack and the furnace; and preheating at least a portion of the oxidant before the oxidant is fed to the burners of the furnace.

3. The method of claim 2, comprising:

detecting a temperature of the oxidant;

in response to detecting the oxidant is at a pre-selected hot oxidant temperature threshold, adjusting operation of the at least one burner in the at least one upstream zone of the furnace so that the at least one burner of the at least one upstream zone of the furnace is adjusted to a mode of operation in which the flame has a radiative underside that is promoted via an oxidant flow passed out of the lower oxidant conduit without oxidant staging being provided via the upper oxidant conduit of the at least one burner of the at least one upstream zone.

4. The method of claim 3, wherein the flame has a radiative underside such that radiative heat is directed along an unobstructed radiative path directly to an upper surface of the glass making material in the at least one upstream zone of the furnace.

5. The method of claim 1, comprising:

detecting a temperature of the furnace;

in response to detecting the furnace is at a pre-selected hot furnace temperature, adjusting operation of the at least one burner in the at least one upstream zone of the furnace so that the at least one burner of the at least one upstream zone of the furnace is adjusted to a mode of operation in which the flame has a radiative underside that is promoted via an oxidant flow passed out of the lower oxidant conduit without oxidant staging being provided via the upper oxidant conduit of the at least one burner of the at least one upstream zone;

preheating at least a portion of the oxidant via an oxidant preheater positioned to heat the oxidant before the oxidant is fed to the burners of the furnace via flue gas output from the furnace that is passed through the oxidant preheater; and preheating at least a portion of the fuel via a fuel preheater positioned to heat the fuel before the fuel is fed to the burners of the furnace via flue gas output from the furnace that is passed through the fuel preheater.

6. The method of claim 5, comprising:

passing the flue gas output from the furnace to a fluid heater to heat a heating medium that is feedable to a glass making feed material pre-heating device;

feeding a portion of the glass making material to the glass making feed material pre-heating device for preheating the portion of the glass making material;

outputting the preheated portion of the glass making material from the glass making feed material pre-heating device to feed to the furnace.

7. The method of claim 6, wherein the glass making feed material pre-heating device includes a rotatable shaft having flights that are rotatable to pass the portion of the glass making material fed to the glass making feed material pre-heating device through the glass making feed material pre-heating device.

8. The method of claim 6, comprising:

passing heated air through a hollow shaft of the glass making feed material pre-heating device for passing into the portion of the glass making material as it passes through the glass making feed material pre-heating device.

9. The method of claim 8, comprising:

forming a slip stream of the heating medium output from the fluid heater to pass through a heat exchanger for heating the air to output the heated air for feeding to the hollow shaft of the glass making feed material pre-heating device.

10. The method of claim 1, comprising:

raising a temperature of the oxidant to a value at or above the pre-selected hot oxidant temperature threshold;

after the oxidant is at or above the pre-selected hot oxidant temperature threshold, adjusting a flow of the oxidant so at least some of the oxidant bypasses an oxidant preheater positioned between the furnace and a stack; and/or after the oxidant is at or above the pre-selected hot oxidant temperature threshold, adjusting a flow of the fuel so at least some of the fuel bypasses a fuel preheater positioned between the furnace and the stack; and/or after the oxidant is at or above the pre-selected hot oxidant temperature threshold, adjusting a flow of the flue gas so that at least a portion of the flue gas bypasses the oxidant preheater and/or the fuel preheater.

* * * * *